(12) United States Patent
Sekiya et al.

(10) Patent No.: US 9,373,110 B2
(45) Date of Patent: Jun. 21, 2016

(54) INFORMATION PROCESSING APPARATUS, INFORMATION PROCESSING METHOD, PROGRAM, AND INFORMATION PROCESSING SYSTEM

(75) Inventors: Shuichi Sekiya, Saitama (JP); Mitsuhiro Kimura, Kanagawa (JP); Naoki Waki, Saitama (JP)

(73) Assignee: FeliCa Networks, Inc. (JP)

( * ) Notice: Subject to any disclaimer, the term of this patent is extended or adjusted under 35 U.S.C. 154(b) by 252 days.

(21) Appl. No.: 13/307,564

(22) Filed: Nov. 30, 2011

(65) Prior Publication Data

US 2012/0149302 A1 Jun. 14, 2012

(30) Foreign Application Priority Data

Dec. 8, 2010 (JP) .............................. P2010-273189

(51) Int. Cl.
*H04B 5/00* (2006.01)
*G06Q 20/32* (2012.01)
(Continued)

(52) U.S. Cl.
CPC .......... *G06Q 20/3278* (2013.01); *G06Q 20/388* (2013.01); *H04M 1/7253* (2013.01); *H04M 2250/04* (2013.01)

(58) Field of Classification Search
CPC .................................. G06F 15/16; H04B 5/00
USPC ............ 455/41.1–41.3, 456, 456.1, 436, 561, 455/522, 404.2; 709/206, 227, 237, 248
See application file for complete search history.

(56) References Cited

U.S. PATENT DOCUMENTS

| 7,519,655 B2 | 4/2009 | Yamagata et al. |
| 7,802,018 B2 | 9/2010 | Yamagata et al. |
| 2003/0046541 A1* | 3/2003 | Gerdes et al. ................. 713/168 |

(Continued)

FOREIGN PATENT DOCUMENTS

| EP | 1391809 A1 | 2/2004 |
| EP | 1892957 A1 | 2/2008 |

(Continued)

OTHER PUBLICATIONS

European Search Report EP 11185818, dated Mar. 2, 2012.

(Continued)

*Primary Examiner* — Andrew Wendell
*Assistant Examiner* — Cindy Trandai
(74) *Attorney, Agent, or Firm* — Lerner, David, Littenberg, Krumholz & Mentlik, LLP

(57) ABSTRACT

An information processing apparatus communicates with an electronic device for performing first contact or noncontact communication and performs second communication different from the first communication with the electronic device. The information processing apparatus includes a data storage unit that stores data in a storage area for each of electronic device users, a program storage unit that stores an application program for a service related to the first communication using the data, a communication unit that performs the second communication, an authentication unit that authenticates the electronic device, a data identifying unit that identifies the data stored in the storage area for the authenticated user, and an execution unit that executes, using identification information that is used for identifying the application program for the service related to the first communication and that is sent from the electronic device and the identified data, the application program corresponding to the identification information.

9 Claims, 12 Drawing Sheets

(51) Int. Cl.
 *G06Q 20/38* (2012.01)
 *H04M 1/725* (2006.01)

(56) References Cited

U.S. PATENT DOCUMENTS

| | | | |
|---|---|---|---|
| 2003/0153300 A1* | 8/2003 | Nakao | 455/410 |
| 2004/0054710 A1* | 3/2004 | Yamagata et al. | 709/200 |
| 2005/0108423 A1* | 5/2005 | Centemeri | 709/237 |
| 2006/0242687 A1 | 10/2006 | Thione et al. | |
| 2008/0022290 A1* | 1/2008 | Ochiai et al. | 719/315 |
| 2010/0075666 A1* | 3/2010 | Garner | H04M 1/7253 455/426.1 |
| 2010/0274859 A1* | 10/2010 | Bucuk | 709/206 |
| 2010/0275019 A1 | 10/2010 | Yamagata et al. | |

FOREIGN PATENT DOCUMENTS

| | | |
|---|---|---|
| JP | 2002-354143 A | 12/2002 |
| JP | 2005122402 A | 5/2005 |
| JP | 2008269207 A | 11/2008 |
| JP | 2010238090 A | 10/2010 |

OTHER PUBLICATIONS

Japanese Office Action for JP Application No. 2014240599, dated Sep. 1, 2015.

Japanese Office Action for JP Application No. 2014240599, dated Mar. 17, 2016.

* cited by examiner

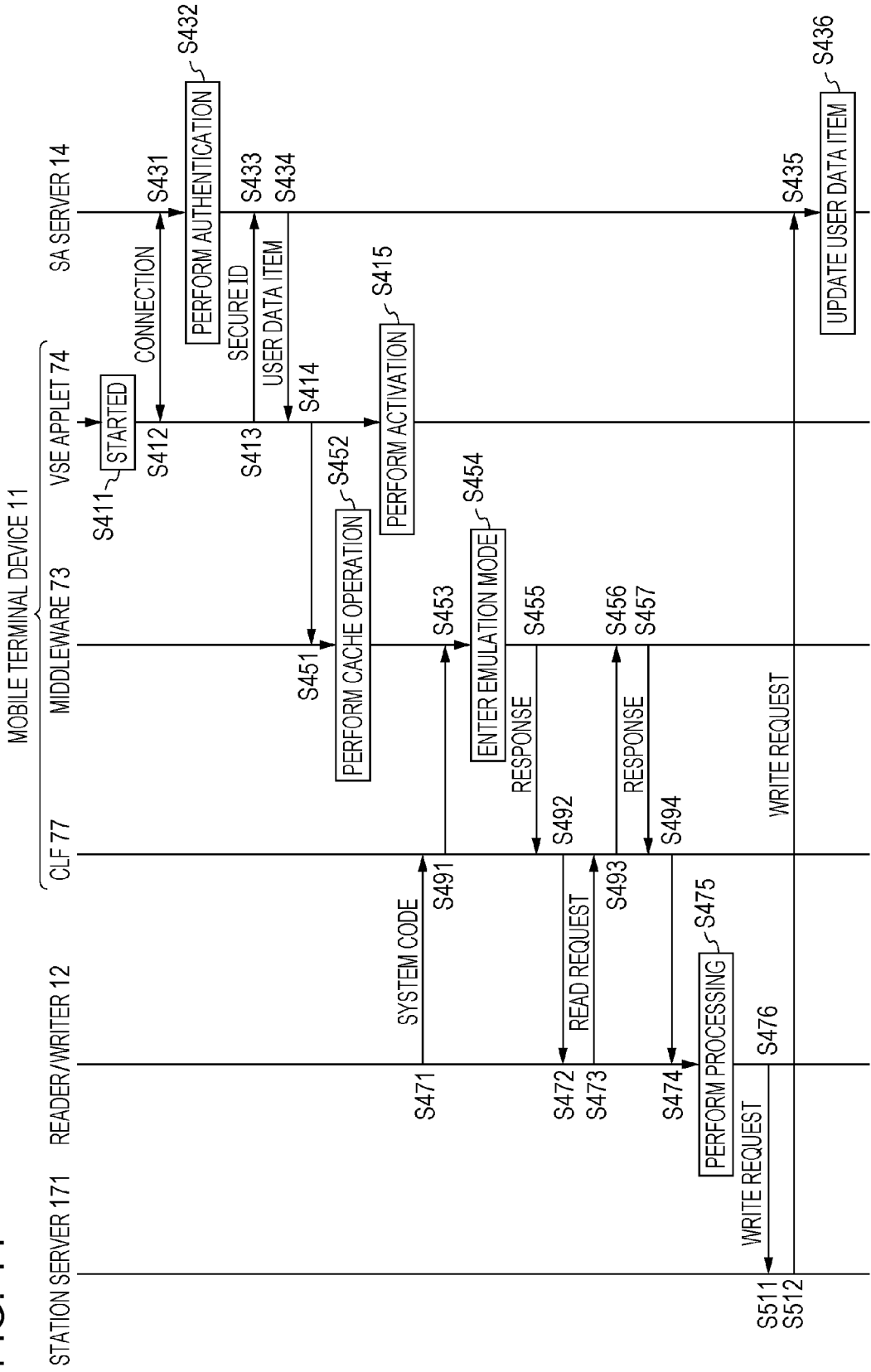

INFORMATION PROCESSING APPARATUS, INFORMATION PROCESSING METHOD, PROGRAM, AND INFORMATION PROCESSING SYSTEM

CROSS-REFERENCE TO RELATED APPLICATION

The present application claims priority from Japanese Patent Application No. JP 2010-273189 filed in the Japanese Patent Office on Dec. 8, 2010, the entire content of which is incorporated herein by reference.

BACKGROUND

The present disclosure relates to an information processing apparatus, an information processing method, a program, and an information processing system and, in particular, to an information processing apparatus, an information processing method, a program, and an information processing system capable of providing services across all platforms of terminal devices in a secure manner.

In recent years, a mobile terminal device (e.g., a cell phone) including an integrated circuit (IC) chip that performs contact or noncontact near field communication has provided a variety of services by executing application programs related to short range communication.

However, since the capacity of a memory of a mobile terminal device for storing application programs is limited, the number of providable services is limited.

In order to address such an issue, a system in which application programs related to short range communication are stored in storage areas having unique identification information items in a server and, when the mobile terminal device starts a service, the application program corresponding to the service is executed on the server has been developed (refer to, for example, Japanese Unexamined Patent Application Publication No. 2002-354143). Such a system allows the mobile terminal device to provide services regardless of the capacity of the memory of the mobile terminal device.

SUMMARY

However, Japanese Unexamined Patent Application Publication No. 2002-354143 does not describe data processed through execution of application programs on a server.

For example, Japanese Unexamined Patent Application Publication No. 2002-354143 does not describe whether the data processed through execution of application programs on a server is stored in the server. Accordingly, if the data processed through execution of application programs is stored in a mobile terminal device, the amount of the data is limited by the capacity of the memory of the mobile terminal device.

In addition, Japanese Unexamined Patent Application Publication No. 2002-354143 does not describe how the security for data processed through execution of application programs on a server is ensured.

Accordingly, the present disclosure provides an information processing apparatus, an information processing method, a program, and an information processing system capable of providing services across all platforms of terminal devices in a secure manner.

According to an embodiment of the present disclosure, an information processing apparatus for communicating with an electronic device that performs first contact or noncontact communication is provided. The information processing apparatus performs second communication different from the first communication with the electronic device. The information processing apparatus includes a data storage unit configured to store a data item in a storage area for each user who uses the electronic device, a program storage unit configured to store an application program that executes a service related to the first communication using the data item, a communication unit configured to perform the second communication, an authentication unit configured to authenticate the electronic device, a data identifying unit configured to identify the data item stored in the storage area for the user of the electronic device authenticated by the authentication unit, and an execution unit configured to execute, on the basis of identification information that is used for identifying the application program that executes the service related to the first communication and that is sent from the electronic device and the data item identified by the identifying unit, the application program corresponding to the identification information.

The data identifying unit can identify the data item stored in the storage area for the user of the electronic device in response to a request sent from a providing apparatus that provides content to the electronic device and that is authenticated by the electronic device via the electronic device.

The data identifying unit can identify the data item stored in the storage area for the user of the electronic device in response to a request sent directly from a providing apparatus that provides content to the electronic device and that is authenticated by the electronic device.

The authentication unit can authenticate a providing apparatus that provides content to the electronic device, and the data identifying unit can identify the data item stored in the storage area for the user of the electronic device in response to a request sent from the providing apparatus authenticated by the authentication unit.

The communication unit can send, to the electronic device, a copy of the data item stored in the storage area of the data storage unit for the user of the electronic device authenticated by the authentication unit, and the identifying unit can identify the data item in response to a request sent from a communication partner of the first communication performed by the electronic device as a result of emulation of the application program for executing the service related to the first communication in the electronic device.

According to another embodiment of the present disclosure, an information processing method for use in an information processing apparatus for communicating with an electronic device that performs first contact or noncontact communication is provided. The information processing apparatus performs second communication different from the first communication with the electronic device. The information processing apparatus includes a data storage unit configured to store a data item in a storage area for each user who uses the electronic device, a program storage unit configured to store an application program that executes a service related to the first communication using the data item, and a communication unit configured to perform the second communication. The method includes authenticating the electronic device, identifying the data item stored in the storage area of the data storage unit for the user of the authenticated electronic device on the basis of authentication information sent from the authenticated electronic device, and executing, on the basis of identification information that is used for identifying the application program that executes the service related to the first communication and that is sent from the electronic device and the identified data item, the application program corresponding to the identification information.

According to still another embodiment of the present disclosure, a program includes program code for causing a computer to execute a process performed in an information processing apparatus for communicating with an electronic device that performs first contact or noncontact communication, where the information processing apparatus performs second communication different from the first communication with the electronic device. The information processing apparatus includes a data storage unit configured to store a data item in a storage area for each user who uses the electronic device, a program storage unit configured to store an application program that executes a service related to the first communication using the data item, and a communication unit configured to perform the second communication. The process includes authenticating the electronic device, identifying the data item stored in the storage area of the data storage unit for the user of the authenticated electronic device on the basis of authentication information sent from the authenticated electronic device, and executing, on the basis of identification information that is used for identifying the application program that executes the service related to the first communication and that is sent from the electronic device and the identified data item, the application program corresponding to the identification information.

According to yet still another embodiment of the present disclosure, an information processing system includes an electronic device that performs first contact or noncontact communication and first and second information processing apparatuses for communicating with the electronic device, where the first and second information processing apparatuses perform second communication different from the first communication with the electronic device. The first information processing apparatus includes an authentication unit configured to authenticate the electronic device, and the second information processing apparatus includes a data storage unit configured to store a data item in a storage area for each user who uses the electronic device, a program storage unit configured to store an application program that executes a service related to the first communication using the data item, a communication unit configured to perform the second communication, an authentication unit configured to authenticate the electronic device, an identifying unit configured to identify the data item stored in the storage area of the data storage unit for the user of the electronic device authenticated by the first information processing apparatus on the basis of authentication information sent from the electronic device authenticated by the first information processing apparatus, and an execution unit configured to execute, on the basis of identification information that is used for identifying the application program that executes the service related to the first communication and that is sent from the electronic device and the data item identified by the identifying unit, the application program corresponding to the identification information.

According to the embodiments of the present disclosure, an electronic device is authenticated, the data item stored in the storage area for the user of the electronic device authenticated by the authentication unit is identified, and, on the basis of identification information that is used for identifying the application program that executes the service related to the first communication and that is sent from the electronic device and the data item identified by the identifying unit, the application program corresponding to the identification information is executed.

According to the embodiments of the present disclosure, services can be provided across all platforms of terminal devices in a secure manner.

BRIEF DESCRIPTION OF THE DRAWINGS

FIG. 14 is a flowchart illustrating an example of a high-speed service provision process.

DETAILED DESCRIPTION OF EMBODIMENTS

Exemplary embodiments of the present disclosure are described below with reference to the accompanying drawings.

Exemplary Configuration of Information Processing System

Figure 1:
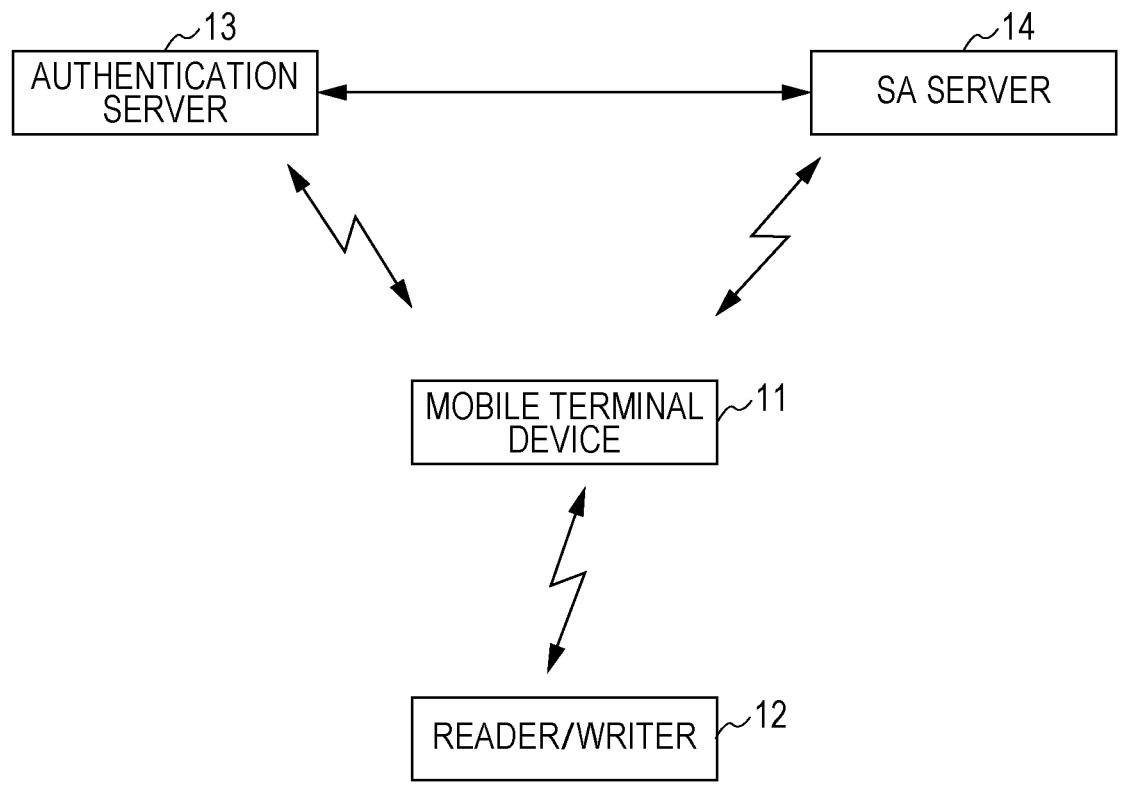
FIG. 1 is a block diagram of an exemplary configuration of an information processing system according to an embodiment of the present disclosure.

FIG. 1 is a block diagram of an exemplary configuration of an information processing system according to an embodiment of the present disclosure. As shown in FIG. 1, the information processing system provides services, such as an electronic money service, a ticket gate service, a time card service, or an entrance management service, to a user using a mobile terminal device 11.

The mobile terminal device 11 is configured as a mobile electronic apparatus, such as a cell phone or a personal digital assistant (PDA). The mobile terminal device performs near field communication (NFC) with a reader/writer 12. Near field communication is started when a distance between devices that communicate with each other is less than several ten centimeters. The near field communication is noncontact communication between the devices. The reader/writer 12 is connected to a server (not shown). The reader/writer 12 performs near field communication with the mobile terminal device 11 and, thereafter, supplies information acquired through the communication to the server.

In addition, the mobile terminal device 11 performs wireless communication with a base station (not shown). Thus, the mobile terminal device 11 communicates with an authentication server 13 and a secure application (SA) server 14 via a network, such as the Internet, connected to the base station. The authentication server 13 and the SA server 14 are connected to each other via a network, such as the Internet. The authentication server 13 communicates with the mobile terminal device 11 and performs authentication process for the mobile terminal device 11. The SA server 14 communicates with the mobile terminal device 11 and executes a program for providing a service to a user using the mobile terminal device 11. In this way, the service can be provided to the user.

In addition, the mobile terminal device 11, the authentication server 13, and the SA server 14 are tamper resistant. Mutual authentication is performed between the mobile terminal device 11 and the authentication server 13 and between the mobile terminal device 11 and the SA server 14.

Exemplary Configuration of Mobile Terminal Device

An exemplary configuration of the mobile terminal device 11 is described next with reference to FIG. 2.

Figure 2:
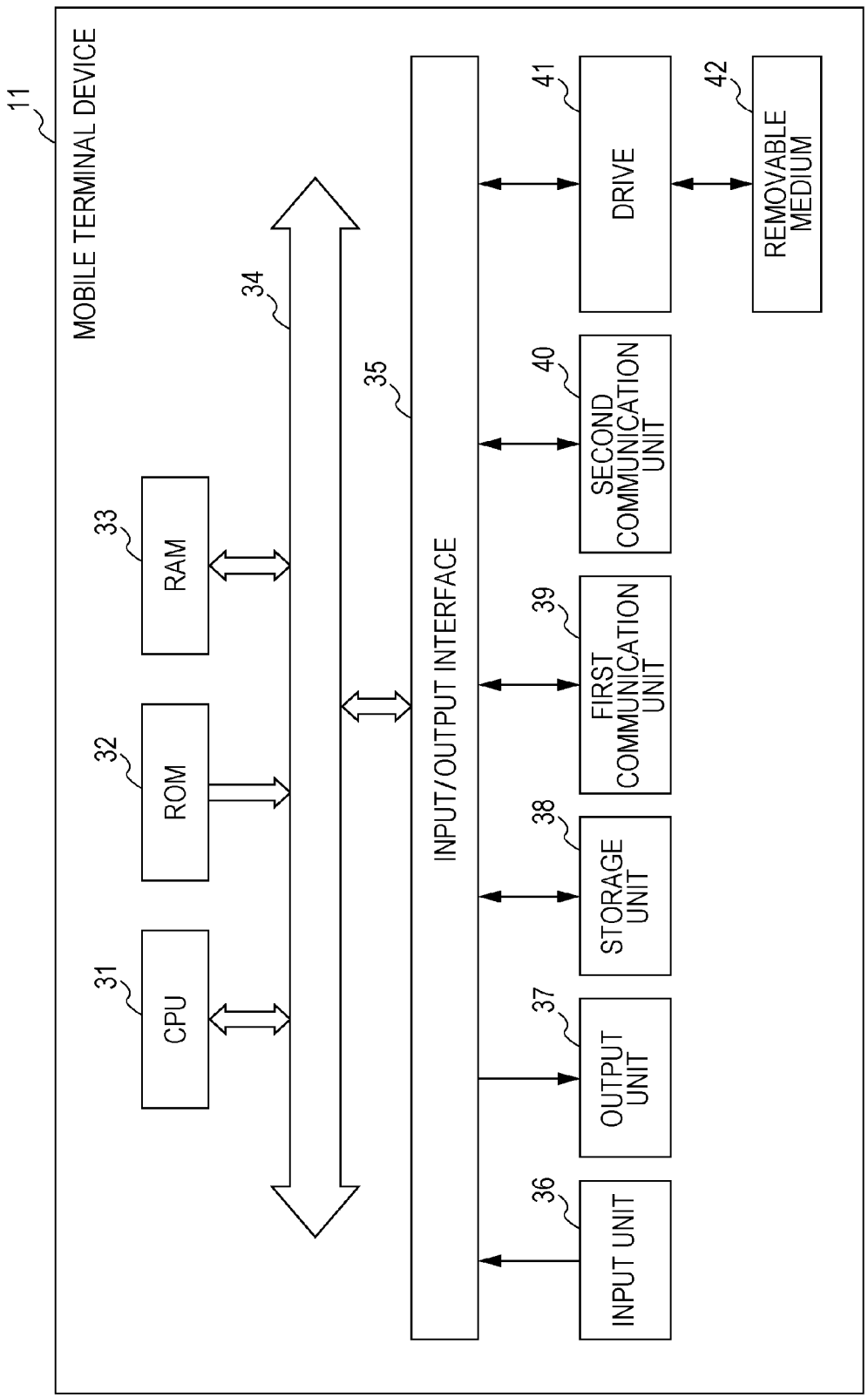
FIG. 2 is a block diagram of an exemplary configuration of a mobile terminal device.

In FIG. 2, a central processing unit (CPU) 31 performs a variety of processes in accordance with programs stored in a read only memory (ROM) 32 or programs loaded into a random access memory (RAM) 33. The RAM 33 also stores data necessary for the CPU 31 to perform the variety of processes.

The CPU 31, the ROM 32, and the RAM 33 are connected to one another via a bus 34. The bus 34 also has an input/output interface 35 connected thereto.

The input/output interface 35 has the following units connected thereto: an input unit 36 including keys, buttons, a touch panel, and a microphone, a display formed from, for example, an LCD (Liquid Crystal Display) or an organic electroluminescence (EL) display, an output unit 37 formed from, for example, a speaker, a storage unit 38 formed from, for example, a hard disk, a first communication unit 39 formed from, for example, an antenna for wireless communication, and a second communication unit 40 formed from, for example, an antenna for near field communication.

The storage unit 38 stores, for example, information that is used for authenticating the mobile terminal device 11 and that is unique to the mobile terminal device 11.

The first communication unit 39 performs a wireless communication process with a base station (not shown). The second communication unit 40 performs a near field communication process with the reader/writer 12.

The input/output interface 35 further has a drive connected thereto as necessary. A removable medium 42 formed from, for example, a semiconductor memory, is mounted in the drive 41 as necessary. A computer program read out of the removable medium 42 is installed in the storage unit 38 as necessary.

Exemplary Configuration of Authentication Server

An exemplary configuration of the authentication server 13 is described next with reference to FIG. 3.

Figure 3:
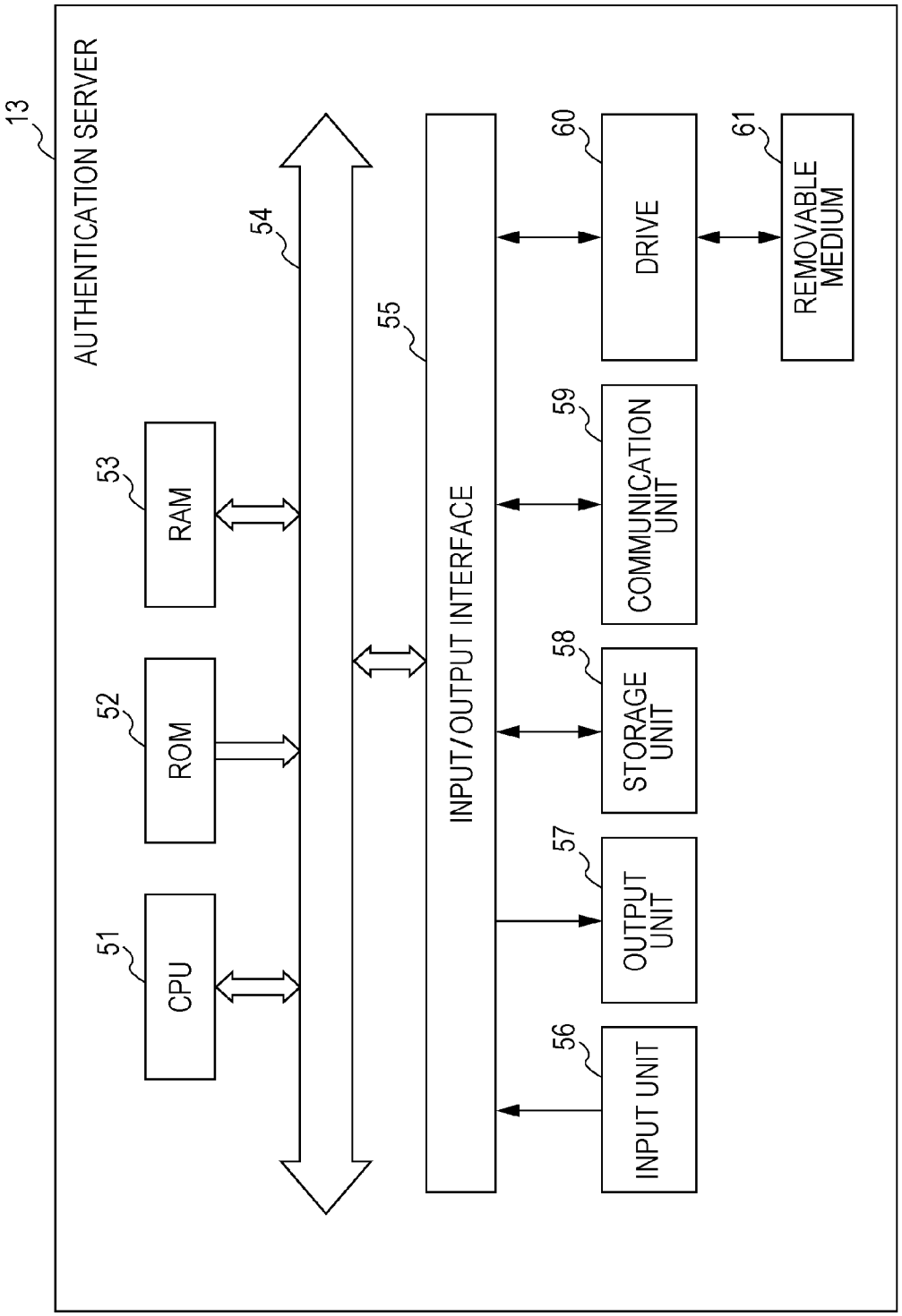
FIG. 3 is a block diagram of an exemplary configuration of an authentication server.

As shown in FIG. 3, a CPU 51 performs a variety of processes in accordance with programs stored in a ROM 52 or programs stored in a RAM 53. The RAM 53 further stores data necessary for the CPU 51 to perform the variety of processes.

The CPU 51, the ROM 52, and the RAM 53 are connected to one another via a bus 54. The bus 54 further has an input/output interface 55 connected thereto.

The input/output interface 55 has the following units connected thereto: an input unit 56 including a keyboard and a mouse, a display formed from, for example, a cathode ray tube (CRT) or a liquid crystal display (LCD), an output unit formed from, for example, a speaker, a storage unit 58 formed from, for example, a hard disk, and a communication unit 59 formed from, for example, a modem or a terminal adaptor.

The communication unit 59 performs a communication process via a network, such as the Internet.

The input/output interface 55 further has a drive connected thereto as necessary. A removable medium 61 formed from, for example, a magnetic disk, an optical disk, a magnetooptical disk, or a semiconductor memory, is mounted in the drive 60 as necessary. A computer program read out of the removable medium 61 is installed in the storage unit 58 as necessary.

Note that since the configuration of the SA server is similar to that of the authentication server 13 illustrated in FIG. 3, description thereof is not repeated.

Exemplary Functional Configuration of Mobile Terminal Device

An exemplary functional configuration of the mobile terminal device 11 is described next with reference to FIG. 4.

Figure 4:
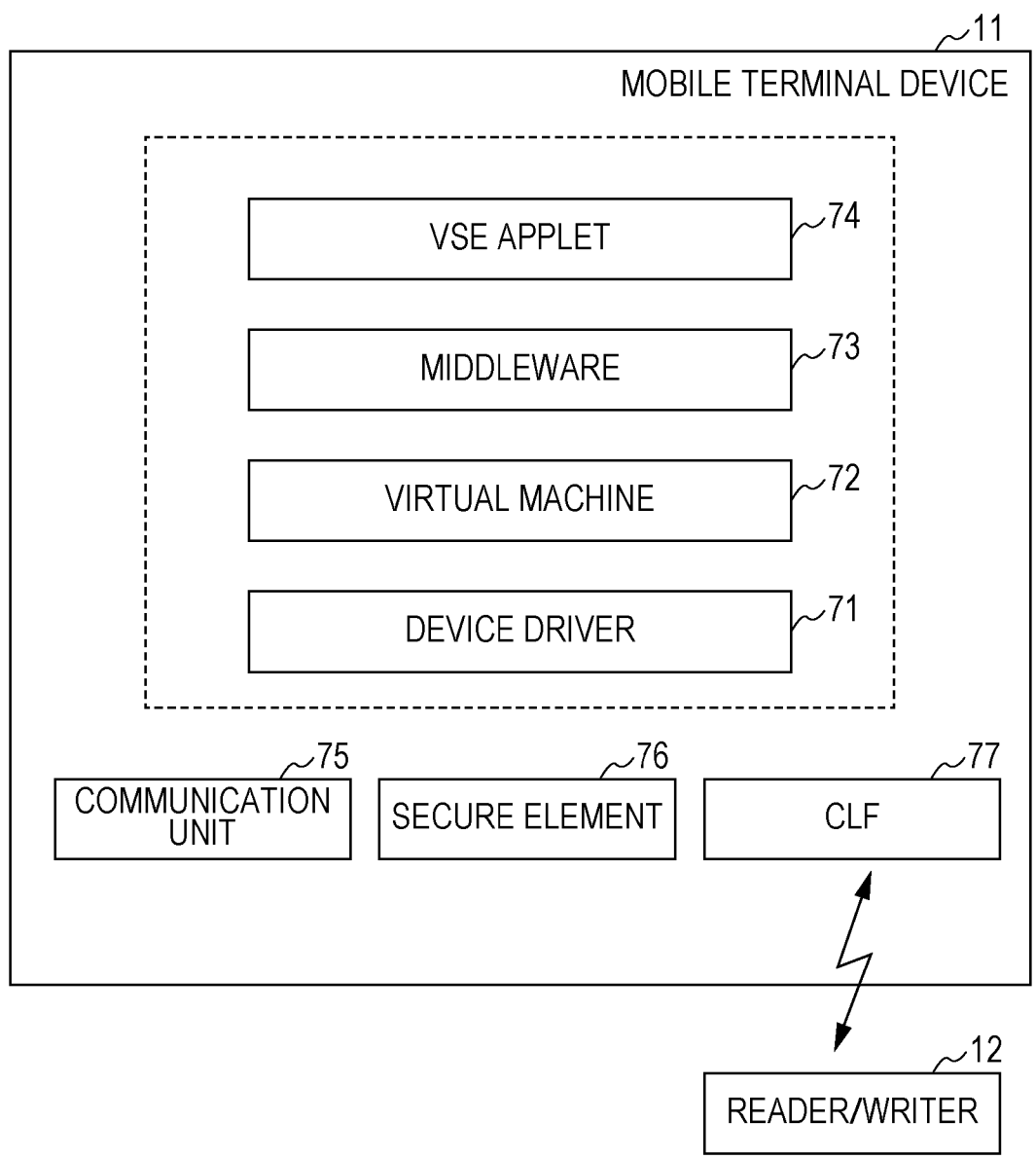
FIG. 4 is a block diagram of an exemplary functional configuration of the mobile terminal device.

As shown in FIG. 4, the mobile terminal device 11 includes a device driver 71, a virtual machine 72, middleware 73, a VSE applet 74, a communication unit 75, a secure element 76, and a contactless front-end (CLF) 77. Note that in the mobile terminal device 11 shown in FIG. 4, the device driver 71, the virtual machine 72, middleware 73, and the virtual secure element (VSE) applet 74 enclosed by a dashed line are realized by the CPU 31 (refer to FIG. 2). In addition, the upper-lower relationship represents layers.

The device driver 71 controls the devices, such as the communication unit 75, the secure element 76, and the CLF 77.

The virtual machine 72 is configured as, for example, a process virtual machine, such as a Dalvik virtual machine.

The middleware 73 has an application program interface (API) and provides functions related to predetermined communication to the VSE applet 74. For example, the middleware 73 provides, to the VSE applet 74, a function of accessing the secure element 76 and a function of communication via the communication unit 75 and the CLF 77. Note that part or the entirety of the middleware 73 may be located in a layer between the device driver 71 and the virtual machine 72.

For example, the VSE applet 74 is an application program running on the virtual machine 72. When the mobile terminal device 11 is operated by a user, the VSE applet 74 performs a process corresponding to the operation. More specifically, the VSE applet 74 performs a process related to communication between the reader/writer 12 and the SA server in accordance with the result of authentication of the mobile terminal device 11.

The communication unit 75 corresponds to the first communication unit 39 shown in FIG. 2. The communication unit communicates with a base station (not shown) and, thereafter, communicates with the authentication server 13 and the SA server 14.

The secure element 76 stores secure data when an application program related to near field communication with the reader/writer 12 is executed. A secure ID, which is information unique to the mobile terminal device 11, is assigned to the secure element 76. In a related art, a secure element stores an applet functioning as an application program executed for providing a service, such as an electronic money service, and persisted user data (described below). In contrast, in the information processing system according to the present embodiment, an applet and user data are stored in the SA server 14.

The CLF 77 corresponds to the second communication unit 40 shown in FIG. 2. The CLF 77 includes an antenna used for performing near field communication with the reader/writer and a controller for controlling the near field communication. The CLF 77 performs the near field communication with the reader/writer 12.

Exemplary Functional Configuration of Authentication Server

An exemplary functional configuration of the authentication server 13 is described next with reference to FIG. 5.

Figure 5:
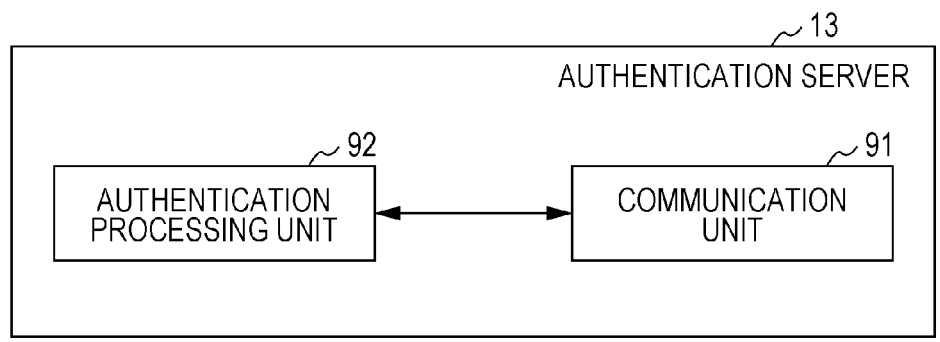
FIG. 5 is a block diagram of an exemplary functional configuration of the authentication server.

As shown in FIG. 5, the authentication server 13 includes a communication unit 91 and an authentication processing unit 92.

The communication unit 91 corresponds to the communication unit 59 shown in FIG. 3. The communication unit 91 communicates with the mobile terminal device 11 and the SA server 14 via a network, such as the Internet.

The authentication processing unit 92 authenticates the mobile terminal device 11 on the basis of authentication information (e.g., the secure ID) that is used for authenticating the mobile terminal device 11 and that is sent from the mobile terminal device 11 via the communication unit 91. If the mobile terminal device 11 is successfully authenticated, the authentication processing unit 92 supplies access information used for accessing the SA server 14 to the mobile terminal device 11 via the communication unit 91.

Exemplary Functional Configuration of SA Server

An exemplary functional configuration of the SA server 14 is described next with reference to FIG. 6.

Figure 6:
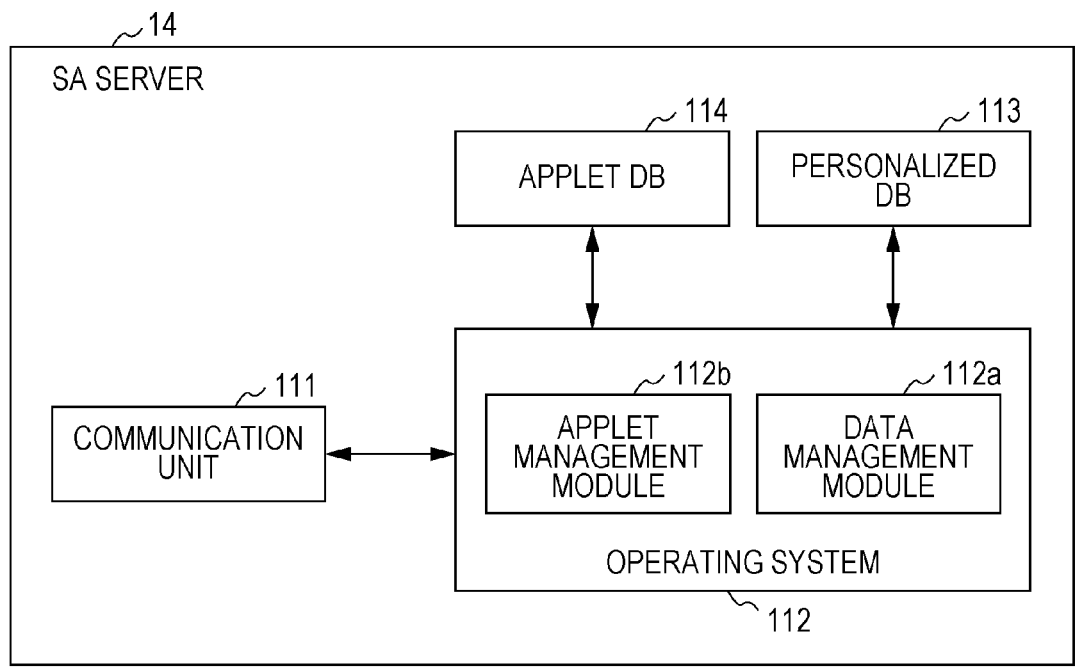
FIG. 6 is a block diagram of an exemplary functional configuration of an SA server.

As shown in FIG. 6, the SA server 14 includes a communication unit 111, an operating system 112, an applet database (DB) 114, and a personalized DB 113.

The communication unit 111 communicates with the mobile terminal device 11 and the authentication server 13 via a network, such as the Internet (not shown).

The operating system 112 performs overall control and management of the SA server 14. The operating system 112 includes a data management module 112a and an applet management module 112b.

The data management unit 112a functions as a file system. The data management unit 112a manages data items stored in the personalized DB 113 (hereinafter referred to as "user data items"). By using the authentication information (the secure ID) of the mobile terminal device 11 that is sent from the mobile terminal device 11 via the communication unit 111, the data management unit 112a identifies a user data item associated with the authentication information from among the user data items stored in the personalized DB 113.

The applet management module 112b manages applets (application programs) stored in the applet DB 114. By using identification information used for identifying an applet and supplied from the mobile terminal device 11 via the communication unit 111, the applet management module 112b selects an applet corresponding to the identification information from among the applets stored in the applet DB 114. Thereafter, the applet management module 112b starts (executes) the applet corresponding to the identification information.

The personalized DB 113 has a storage area for each of the authentication information items unique to mobile terminal devices 11 (i.e., users). The personalized DB 113 stores, in each of the storage areas, a user data item corresponding to one of the authentication information items. In the personalized DB 113, the user data stored in each of the storage areas for the users is persisted data.

The applet DB 114 stores applets to be executed for providing services (e.g., an electronic money service) to the user of the mobile terminal device 11. Each of the applets stored in the applet DB 114 has assigned identification information unique to the applet. The applet stored in the applet DB 114 is started when the identification information unique to the applet is sent from the mobile terminal device 11. Note that in the applet DB 114, the applets are pre-registered for each of content providers that offer the applets.

The applet DB 114 stores, for example, an applet having a FeliCa® OS function. In general, FeliCa OS performs a process related to a service such as an electronic money service. Electronic apparatuses including FeliCa OS are used for mercantile transaction instead of credit cards or prepaid cards. In the SA server 14, the applet management module 112b of the operating system 112 starts a contact or noncontact IC card applet, such as FeliCa OS, originally installed in the mobile terminal device 11. In this way, the SA server 14 provides a service such as an electronic money service to the user of the mobile terminal device 11 through communication with the mobile terminal device 11.

As described above, an applet that originally ran on the mobile terminal device 11 and that executes a service related to near field communication with the reader/writer 12 can be started on the SA server 14.

User Registration

User registration performed by the mobile terminal device 11 is described next.

First, in order to apply for registration for use of an applet provided by some content provider, the user performs an operation on the mobile terminal device 11. The mobile terminal device 11 displays a user registration screen of a Web browser. At that time, the VSE applet 74 is started. The VSE applet 74 connects the mobile terminal device 11 to the authentication server 13. Thereafter, the authentication processing unit 92 of the authentication server 13 authenticates the mobile terminal device 11 by authenticating the secure element 76 through the VSE applet 74. If the mobile terminal device 11 is successfully authenticated, the authentication server 13 acquires the secure ID stored in the secure element 76 through the VSE applet 74. More specifically, the VSE applet 74 accesses the secure element 76 and acquires the secure ID. Subsequently, the VSE applet 74 sends (supplies) the acquired secure ID to the authentication server 13 via the communication unit 75. The secure ID serves as the authentication information regarding the mobile terminal device 11.

The authentication server 13 sends (supplies) the acquired secure ID to the SA server 14. In the SA server 14, the operating system 112 stores the secure ID received from the authentication server 13 in a storage unit (not shown). In this way, user registration is completed. Note that at the same time, personal information (personalized data) regarding the user, such as the membership number and the name, that is necessary for the content provider is also stored together with the secure ID. In addition, in the SA server 14, the data management module 112a acquires a storage area corresponding to the secure ID in the personalized DB 113, generates a data area to be used by the applet that has been registered by the user in the storage area, and sets the data (the user data) to initial values.

While the user registration has been described with reference to registration performed through the VSE applet 74, the user registration is not limited thereto. For example, user registration may be made through a content provider (CP) server owned by the content provider (CP) in accordance with an operation performed by the user on a user registration screen displayed in a Web browser.

Example of Service Provision Process

An example of a service provision process performed when an applet stored in the SA server 14 is started in the above-described manner is described next with reference to a flowchart shown in FIG. 7.

In this case, in order to receive a desired service, a user moves their mobile terminal device 11 closer to the reader/writer 12 so that the mobile terminal device 11 performs near field communication with the reader/writer 12.

For example, if the user taps an icon of the VSE applet 74 displayed on a display screen of the mobile terminal device 11, the mobile terminal device 11, in step S11, starts the VSE applet 74. The VSE applet 74 connects the mobile terminal device 11 to the authentication server 13 (steps S12 and S31). In step S32, the authentication processing unit 92 of the authentication server 13 authenticates the secure element 76 via the VSE applet 74 and, thus, authenticates the mobile terminal device 11. If the mobile terminal device 11 is successfully authenticated, the VSE applet 74 accesses the secure element 76 and acquires the secure ID.

In step S13, the VSE applet 74 sends (supplies) the acquired secure ID to the authentication server 13 via the communication unit 75, a base station, and a network, such as the Internet.

In step S33, the communication unit 91 of the authentication server 13 receives the secure ID sent from the mobile terminal device 11 via the network, such as the Internet, and supplies the secure ID to the authentication processing unit 92.

After the secure ID is supplied from the communication unit 91 to the authentication processing unit 92 in step S33, the authentication processing unit 92 issues a one-time uniform resource locator (URL). The one-time URL is used for the mobile terminal device 11 to access the SA server 14 and is effective only once. Note that access information used for the mobile terminal device 11 to access the SA server 14 is not limited to a one-time URL. Other information may be used.

In step S34, the communication unit 91 of the authentication server 13 sends the one-time URL issued by the authentication processing unit 92 to the VSE applet 74 via the network, such as the Internet, and the base station.

Upon receiving the one-time URL from the authentication server 13 in step S14, the VSE applet 74, in step S15, sends a connection request to the SA server 14 on the basis of the one-time URL. Note that the connection request includes the secure ID.

In step S51, the communication unit 111 of the SA server 14 receives the connection request from the VSE applet 74. The operating system 112 verifies that the connection request was sent from a registered user on the basis of the secure ID included in the connection request received from the VSE applet 74. In step S52, the communication unit 111 sends a response to the connection request to the VSE applet 74. In step S16, the VSE applet 74 receives the response from the SA server 14. In this way, connection between the VSE applet 74 (the mobile terminal device 11) and the SA server 14 is established.

Subsequently, in step S53, the operating system 112 of the SA server 14 enters a standby mode until an applet is started.

In addition, in step S17, the VSE applet 74 activates the mobile terminal device 11. More specifically, the VSE applet 74 changes the display color of the display screen of the mobile terminal device 11 and causes the CLF 77 to enter a standby mode for near field communication.

At that time, since the display color of the display screen of the mobile terminal device 11 is changed, the user recognizes that the mobile terminal device 11 can perform near field communication and passes the mobile terminal device 11 over the reader/writer 12 (moves the mobile terminal device 11 closer to the reader/writer 12).

When the mobile terminal device 11 and the reader/writer 12 are in close proximity to each other, the reader/writer 12, in step S71, transmits a polling command (hereinafter simply referred to as "polling") to the CLF 77. Upon receiving the polling from the reader/writer 12 in step S91, the CLF 77, in step S92, transmits a response to the polling to the reader/writer 12. In step S72, the reader/writer 12 receives the response from the CLF 77. In this way, by transmitting a polling, the reader/writer 12 recognizes the mobile terminal device 11 as a communication partner.

In this case, the communication protocol of the near field communication performed between the mobile terminal device 11 and the reader/writer 12 is Type A or Type B defined by ISO 14443. One of the general-purpose command format used in such protocol (a communication method) is a command format referred to as Application Protocol Data Unit (APDU) defined by ISO 7816-4. Hereinafter, a command that complies with the APDU command format is referred to as an "APDU command".

Referring back to FIG. 7, after processes in steps S71, S72, S91, and S92 have been completed, communication using the Type A or Type B method is repeated between the mobile terminal device 11 and the reader/writer 12. In this way, communication based on ISO 14443-3 is performed. In step S73, in order to select one of applets (applications) and start the applet, the reader/writer 12 sends an APDU command "select(AID)" to the CLF 77.

Note that an AID (Application Identifier) is identification information defined by ISO 7816-5. An AID is used for identifying an applet. An AID is uniquely assigned to an applet.

In step S93, upon receiving select(AID) from the reader/writer 12, the CLF 77 supplies the received select(AID) to the VSE applet 74.

Upon receiving select(AID) from the CLF 77 in step S18, the VSE applet 74 supplies the received select(AID) to the SA server 14.

Note that for example, the Hyper Text Transfer Protocol (HTTP) or the Hyper Text Transfer Protocol Secure (HTTPS) having a security level that is higher than that of HTTP is used as the communication protocol of communication performed between the VSE applet 74 (the mobile terminal device 11) and the SA server 14. More specifically, for example, Thin Client Application Protocol (TCAP) is used. TCAP is a protocol used for a FeliCa-compliant server application to manipulate a FeliCa-compliant cell phone or reader/writer via a network. TAP is used for, for example, electronic payment. However, the communication protocol between the mobile terminal device 11 and the SA server 14 is not limited to HTTP or HTTPS. For example, TCP/IP (Transmission Control Protocol/Internet Protocol) can be used as the communication protocol.

In step S54, the communication unit 111 of the SA server 14 receives select(AID) from the VSE applet 74 and supplies the received select(AID) to the operating system 112.

In step S55, the data management module 112a of the operating system 112 identifies the user data item in the data area used for the applet identified by AID in select(AID) from among user data items in the storage area of the personalized DB 113 corresponding to the secure ID on the basis of the secure ID received in step S51 and select(AID) received from the VSE applet 74.

In step S56, the applet management module 112b of the operating system 112 selects, from the applet DB 114, an applet corresponding to AID in select(AID) received from the VSE applet 74 using the user data item identified by the data management module 112a and starts the selected applet.

In step S57, the operating system 112 supplies a response to select(AID) to the communication unit 111 and causes the communication unit 111 to send a response to the VSE applet 74 using TCAP.

In step S19, upon receiving the response to select(AID) from the SA server 14, the VSE applet 74 sends the response to the received select(AID) to the CLF 77.

In step S94, upon receiving the response from the VSE applet 74, the CLF 77 sends the received response to the reader/writer 12. In step S74, the reader/writer 12 receives the response from the CLF 77.

In steps subsequent to step S74, the reader/writer sends APDU commands, such as an authentication request command, a READ command (a reference command), and a WRITE command (an update command), to the CLF 77. The CLF 77 supplies the APDU commands received from the reader/writer 12 to the VSE applet 74. The VSE applet 74 sends the APDU commands to the SA server 14. The SA server 14 performs a process corresponding to each of the sent APDU commands and sends a response (the result of the process) to the VSE applet 74. The VSE applet 74 supplies the response sent from the SA server 14 to the CLF 77. The CLF 77 sends the response to the reader/writer 12.

In this way, the mobile terminal device 11 (the VSE applet 74) operates as a gateway. Accordingly, the APDU commands are communicated between the reader/writer 12 and the SA server 14, and an applet is executed on the SA server 14. Thus, a service is provided to the user of the mobile terminal device 11.

At that time, the user causes the mobile terminal device 11 to perform near field communication with the reader/writer 12 in the same way as previously. In this way, the user can receive a service provided by an applet executed on the SA server 14 as in the case in which the user receives the service provided by an applet executed on the mobile terminal device 11.

Through the above-described processing, the mobile terminal device 11 is authenticated using the secure ID. A request for starting an applet is sent from the reader/writer that performs near field communication with the authenticated mobile terminal device 11 to the SA server 14 via the mobile terminal device 11. The SA server 14 identifies a user data item used by the applet that corresponds to the secure ID and that is requested to be started and starts the applet using the identified data item. As described above, since the user data item is stored in the SA server 14 and the applet is executed, it is not necessary for the mobile terminal device 11 to store the user data item and execute the applet. Thus, services related to near field communication can be provided to the users without being limited by the platform of the mobile terminal device 11 and the processing power and the capacity of the memory of the mobile terminal device 11. In addition, since user data items are managed using the secure IDs, which are authentication information regarding the mobile terminal devices 11, the security of the user data items can be sufficiently ensured. As a result, services across all terminal devices can be provided in a secure manner.

In addition, when a user data item is stored in the mobile terminal device 11, the storage area for the user data item used for an applet provided by a content provider (CP) is limited due to limitation of the storage capacity of the mobile terminal device 11. However, in the above-described processing, since a user data item is stored in the SA server 14 having a large storage capacity, the storage area for a user data item used by each of the applets can be flexibly assigned. Thus, a system having the fairness for all content providers (CPs) can be provided.

Furthermore, in existing systems, it is difficult to totally manage the logs (the transaction logs) of near field communication performed by the mobile terminal devices 11. However, in the above-described configuration, the transaction log is equivalent to the log of communication between the reader/writer 12 and the SA server 14. Thus, the SA server 14 can easily manage all of the transaction logs. In this way, the SA server 14 can recognize which services are used by which users of the mobile terminal devices 11. Accordingly, for example, a service that further suits the user's preference can be provided.

Figure 8:
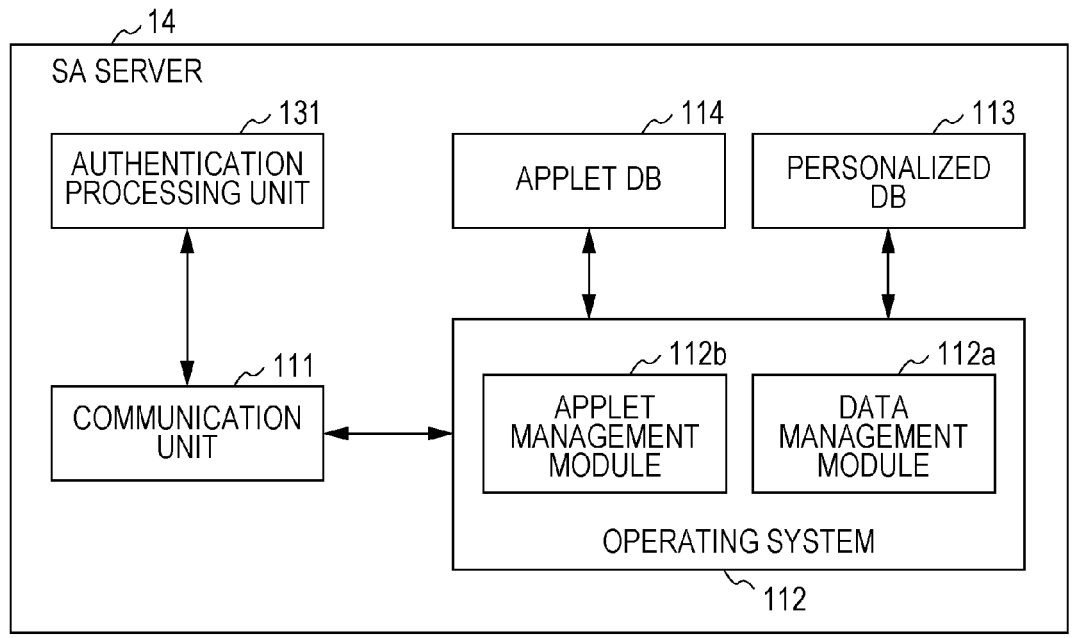
FIG. 8 is a block diagram of another exemplary functional configuration of the SA server.

While the above embodiment has been described with reference to the authentication server 13 and the SA server 14 separated from each other, the authentication server 13 and the SA server 14 may be integrated into one body as shown in FIG. 8.

FIG. 8 is a block diagram illustrating an example of the functional configuration of the SA server 14 including the function of the authentication server 13. Note that the same names and numbering will be used in describing the SA server 14 shown in FIG. 8 as was utilized above in describing the SA server 14 in FIG. 6, and descriptions thereof are not repeated, where appropriate.

That is, as can be seen from the SA server 14 shown in FIG. 8, an authentication processing unit 131 is additionally provided in the SA server 14 shown in FIG. 6. Note that the authentication processing unit 131 has a function that is the same as that of the authentication processing unit 92 of the authentication server 13 shown in FIG. 5. Accordingly, description of the authentication processing unit 131 is not provided here.

Figure 7:
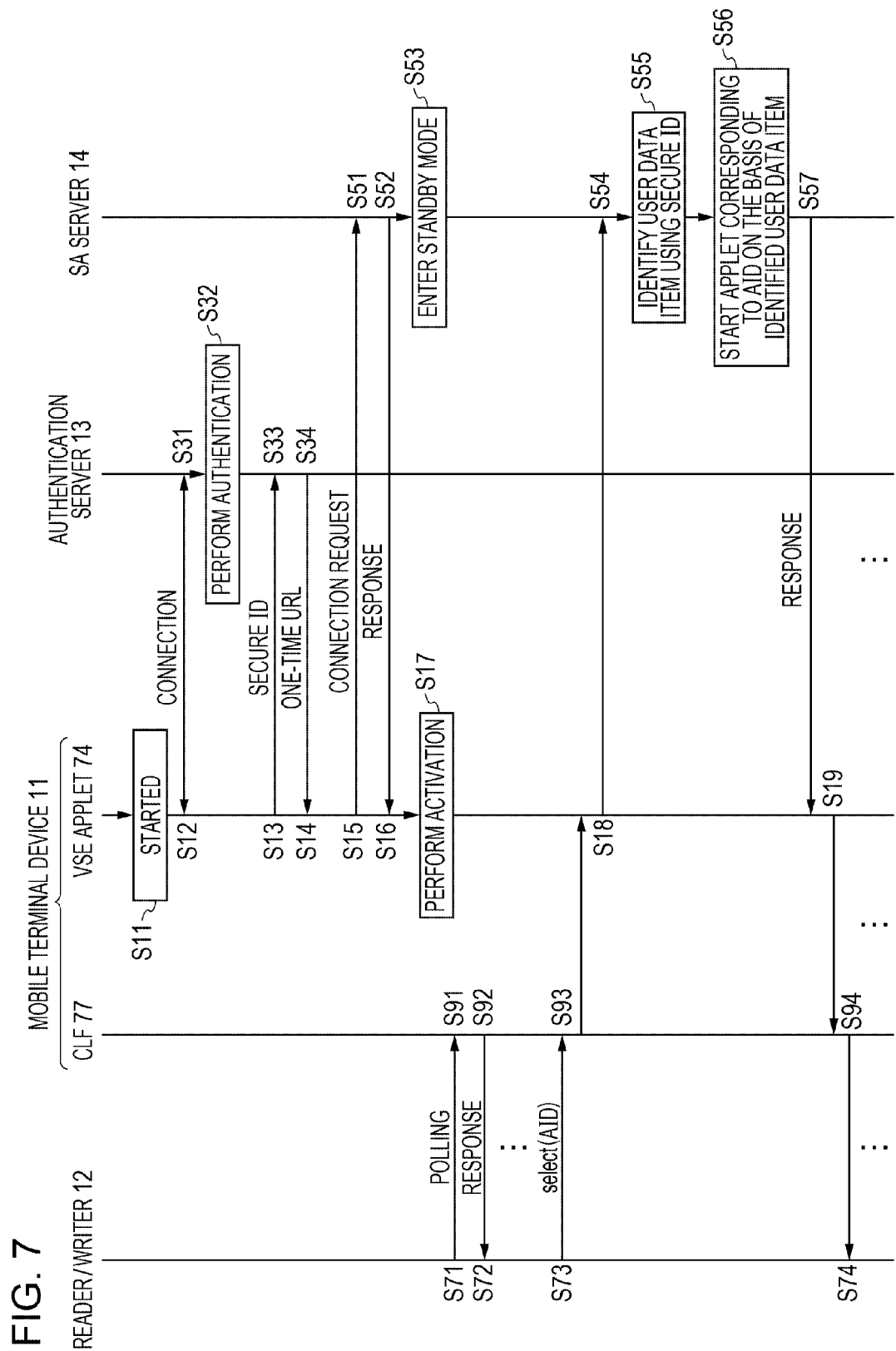
FIG. 7 is a flowchart illustrating an example of a service provision process.

Note that in the configuration of the SA server 14 shown in FIG. 8, it is not necessary that, in the process indicated by the flowchart shown in FIG. 7, the SA server 14 send a one-time URL to the VSE applet 74 after the VSE applet 74 is authenticated.

In addition, since, as described above, a user data item is managed by the SA server 14, the user data item may be referenced or updated by the content provider in addition to the user.

An exemplary configuration of the information processing system in which a user or a content provider can reference or update a user data item in the SA server 14 is described below.
Exemplary Configuration of Information Processing System Referencing or Updating User Data FIG. 9 illustrates an exemplary configuration of the information processing system in which a user or a content provider can reference or update a user data item in the SA server 14.

Figure 9:
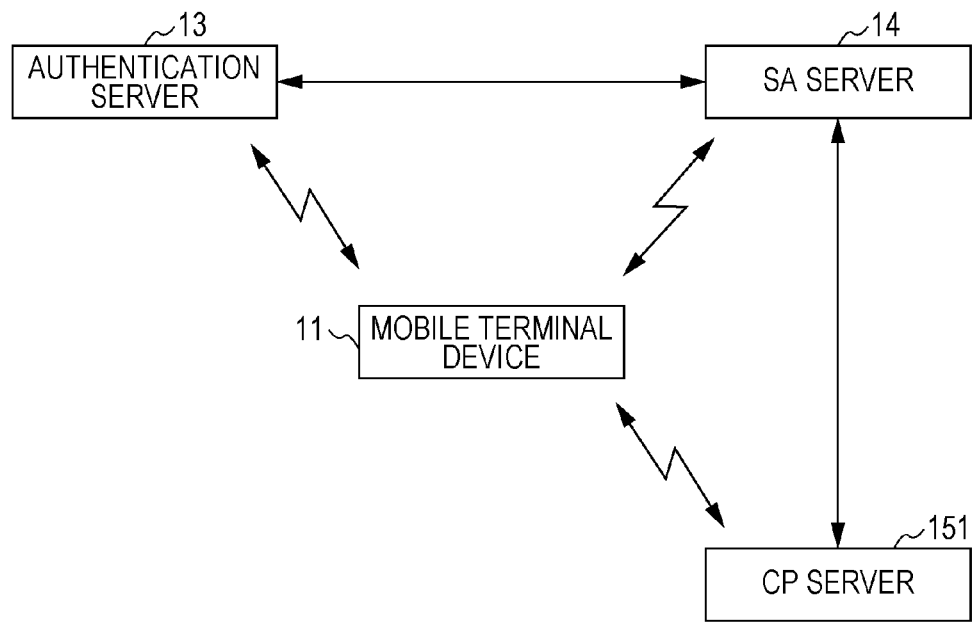
FIG. 9 is a block diagram of an exemplary configuration of an information processing system in which user data is referenced or updated.

Note that the same names and numbering will be used in describing the information processing system shown in FIG. 9 as was utilized above in describing the information processing system in FIG. 1, and descriptions thereof are not repeated, where appropriate.

That is, as can be seen from the information processing system shown in FIG. 9, the reader/writer 12 is removed from the information processing system shown in FIG. 1 and a content provider (CP) server 151 is additionally provided in the information processing system shown in FIG. 1.

The mobile terminal device 11 performs wireless communication with a base station (not shown) and communicates with the authentication server 13 and the SA server 14 via a network, such as the Internet, connected to the base station. In addition, the mobile terminal device 11 communicates with the CP server 151. The authentication server 13, the SA server 14, and the CP server 151 are connected to one another via the network, such as the Internet.

In response to a request from the mobile terminal device 11, the CP server 151 provides predetermined content to the mobile terminal device 11. In addition, the CP server 151 issues a permit for accessing the SA server 14 and sends the permit to the mobile terminal device 11 or the authentication server 13. If the permit is authenticated by the mobile terminal device 11 or the authentication server 13, the CP server 151 can access the SA server 14.

The process for referencing or updating a user data item performed in the information processing system shown in FIG. 9 is described below.

Example 1 of Process for Referencing or Updating User Data

Figure 10:
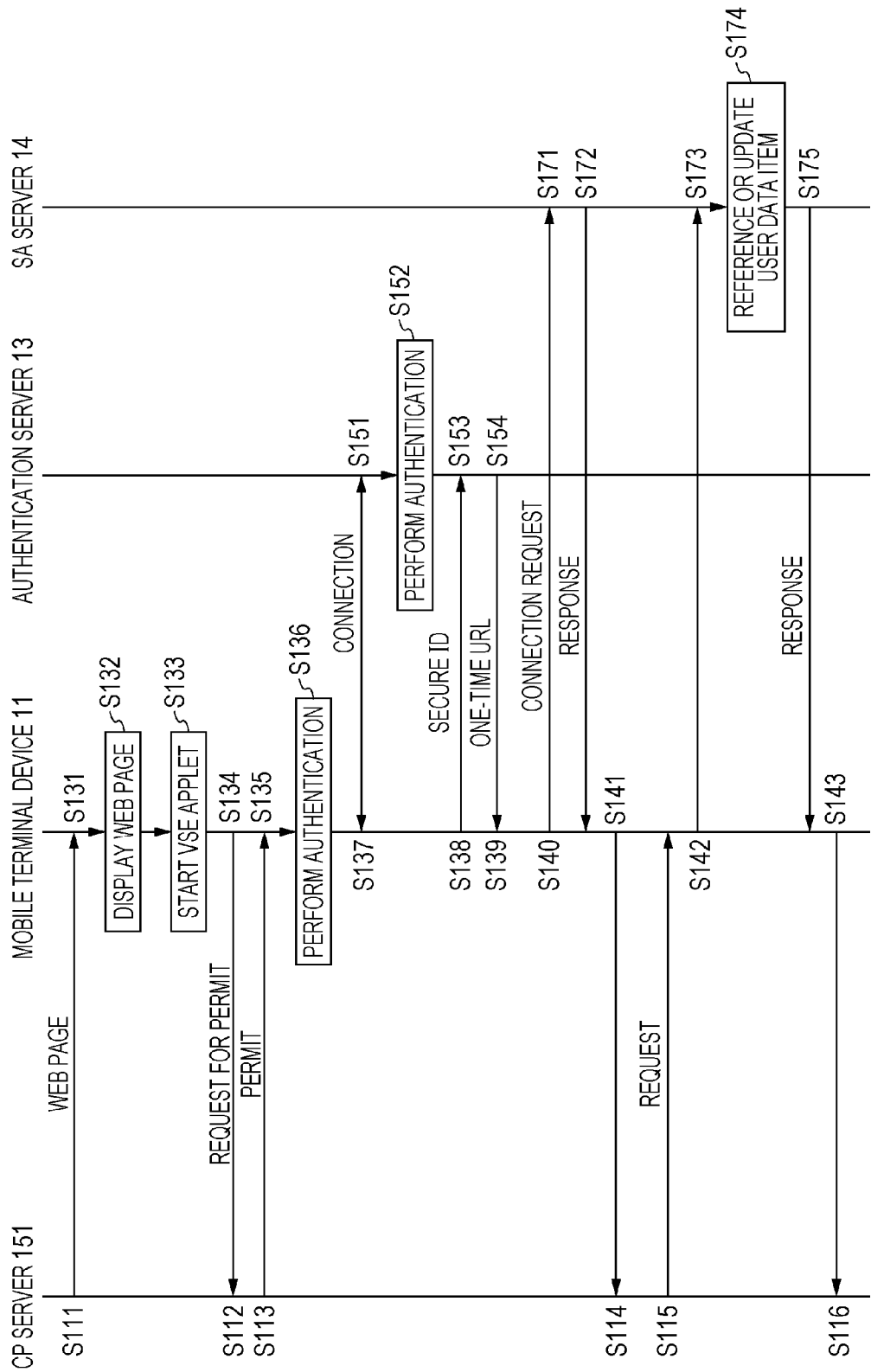
FIG. 10 is a flowchart illustrating an example of a process for referencing or updating user data.

A process performed by a user of the mobile terminal device 11 to reference or update a user data item in the SA server 14 via the CP server 151 is described first with reference to a flowchart shown in FIG. 10.

When the user uses a Web browser of the mobile terminal device 11 and requests the CP server 151 to send desired content, the CP server 151 sends, to the mobile terminal device 11, a Web page corresponding to the request in step S111.

In step S131, the mobile terminal device 11 receives the Web page from the CP server 151. In step S132, the mobile terminal device 11 displays the Web page in the Web browser.

When the user operates the Web page displayed in the Web browser of the mobile terminal device 11 in order to start the VSE applet 74 (e.g., the user presses a start link button for starting the VSE applet 74), the mobile terminal device 11, in step S133, starts the VSE applet 74. After that time, in the mobile terminal device 11, the VSE applet 74 functions as a plug-in of the Web browser.

Subsequently, in step S134, after acquiring the URL of the CP server 151 in order to access the CP server 151, the VSE applet 74 sends, to the CP server 151, a request for a permit that allows the CP server 151 (a permit request) to access the SA server 14. The URL of the CP server 151 is stored in, for example, the start link button for starting the VSE applet 74 in the Web page displayed in the Web browser.

Upon receiving the permit request from the VSE applet 74 in step S112, the CP server 151 issues a permit that allows access to the SA server 14. In step S113, the CP server 151 sends the permit to the mobile terminal device 11. Note that the permit may be prestored in the CP server 151.

Upon receiving the permit from the CP server 151 in step S135, the mobile terminal device 11, in step S136, authenticates the received permit. If the permit is successfully authenticated, the VSE applet 74 of the mobile terminal device 11 connects the mobile terminal device 11 to the authentication server 13 (step S137 and step S151). In step S152, the authentication processing unit 92 of the authentication server 13 authenticates the secure element 76 via the VSE applet 74. In this way, the authentication processing unit 92 authenticates the mobile terminal device 11. If the mobile terminal device 11 is successfully authenticated, the VSE applet 74 accesses the secure element 76 and acquires the secure ID. In step S138, the VSE applet 74 sends the acquired secure ID to the authentication server 13.

In step S153, the communication unit 91 of the authentication server 13 receives the secure ID sent from the mobile terminal device 11 and supplies the received secure ID to the authentication processing unit 92.

After the secure ID is supplied from the communication unit 91 to the authentication processing unit 92 in step S153, the authentication processing unit 92 issues a one-time URL.

In step S154, the communication unit 91 of the authentication server 13 sends the one-time URL issued by the authentication processing unit 92 to the mobile terminal device 11.

Upon receiving the one-time URL from the authentication server 13 in step S139, the VSE applet 74 of the mobile terminal device 11, in step S140, sends a connection request to the SA server 14 using the one-time URL. Note that the connection request includes the secure ID.

In step S171, the communication unit 111 of the SA server 14 receives the connection request from the VSE applet 74. The operating system 112 verifies that the connection request is sent from a registered user using the secure ID included in the connection request sent from the VSE applet 74. In step S172, the communication unit 111 sends a response to the connection request to the mobile terminal device 11.

Upon receiving the response from the SA server 14 in step S141, the VSE applet 74 of the mobile terminal device 11 sends the response to the CP server 151. In step S114, the CP server 151 receives the response from the VSE applet 74. In this way, connection between the CP server 151 and the SA server 14 via the mobile terminal device 11 is established.

At that time, if the user operates the Web page displayed in the Web browser of the mobile terminal device 11 in order to reference or update the user data item, the CP server 151, in step S115, sends a request command for referencing or updating the user data item to the mobile terminal device 11. The request command includes an AID for identifying an applet used for referencing or updating the user data item.

In step S142, the mobile terminal device 11 receives the request command from the CP server 151 and sends the received request command to the SA server 14 using the TCAP. At that time, the request command includes the secure ID of the mobile terminal device 11.

Upon receiving the request command from the mobile terminal device 11 in step S173, the SA server 14, in step S174, references or updates the user data item identified by the secure ID and the AID included in the request command.

In step S175, the SA server 14 sends a response to the request command to the mobile terminal device 11 using the TCAP.

Upon receiving the response from the SA server 14 in step S143, the mobile terminal device 11 sends the received response to the CP server 151.

Upon receiving the response from the mobile terminal device 11 in step S116, the CP server 151 sends, to the mobile terminal device 11, the information corresponding to the response in the form of a Web page.

Note that the request command sent from the CP server 151 is a READ command (a reference command) or a WRITE command (an update command). More specifically, when the user of the mobile terminal device 11 requests to refer to the user data item, the CP server 151 sends a READ command to the SA server 14, and the SA server 14 sends a response to the READ command to the CP server 151. In addition, when the user of the mobile terminal device 11 requests to update a user data item, the CP server 151 requests to refer to the user data item and receives a response to the request. Thereafter, the CP server 151 sends a WRITE command to the SA server 14. The SA server 14 sends a response to the WRITE command to the CP server 151.

Note that in the mobile terminal device 11, the VSE applet 74 performs a process in accordance with a command received from the CP server 151 as a script. At that time, it is necessary that commands communicated between the mobile terminal device 11 and the SA server 14 comply with the APDU command format. However, the command communicated between the mobile terminal device 11 and the CP server 151 may not comply with the APDU command format.

In this way, the user of the mobile terminal device 11 can reference or update the user data item in the SA server 14 via the CP server 151.

While the above description has been made with reference to the CP server 151 sending a request command to the SA server 14 via the mobile terminal device 11, the CP server 151 may directly send a request command to the SA server 14.

Example 2 of Process for Referencing or Updating User Data

A process in which the user of the mobile terminal device 11 references or updates the user data item in the SA server 14 via the CP server 151 that directly sends a request command to the SA server 14 is described next with reference to a flowchart shown in FIG. 11.

Figure 11:
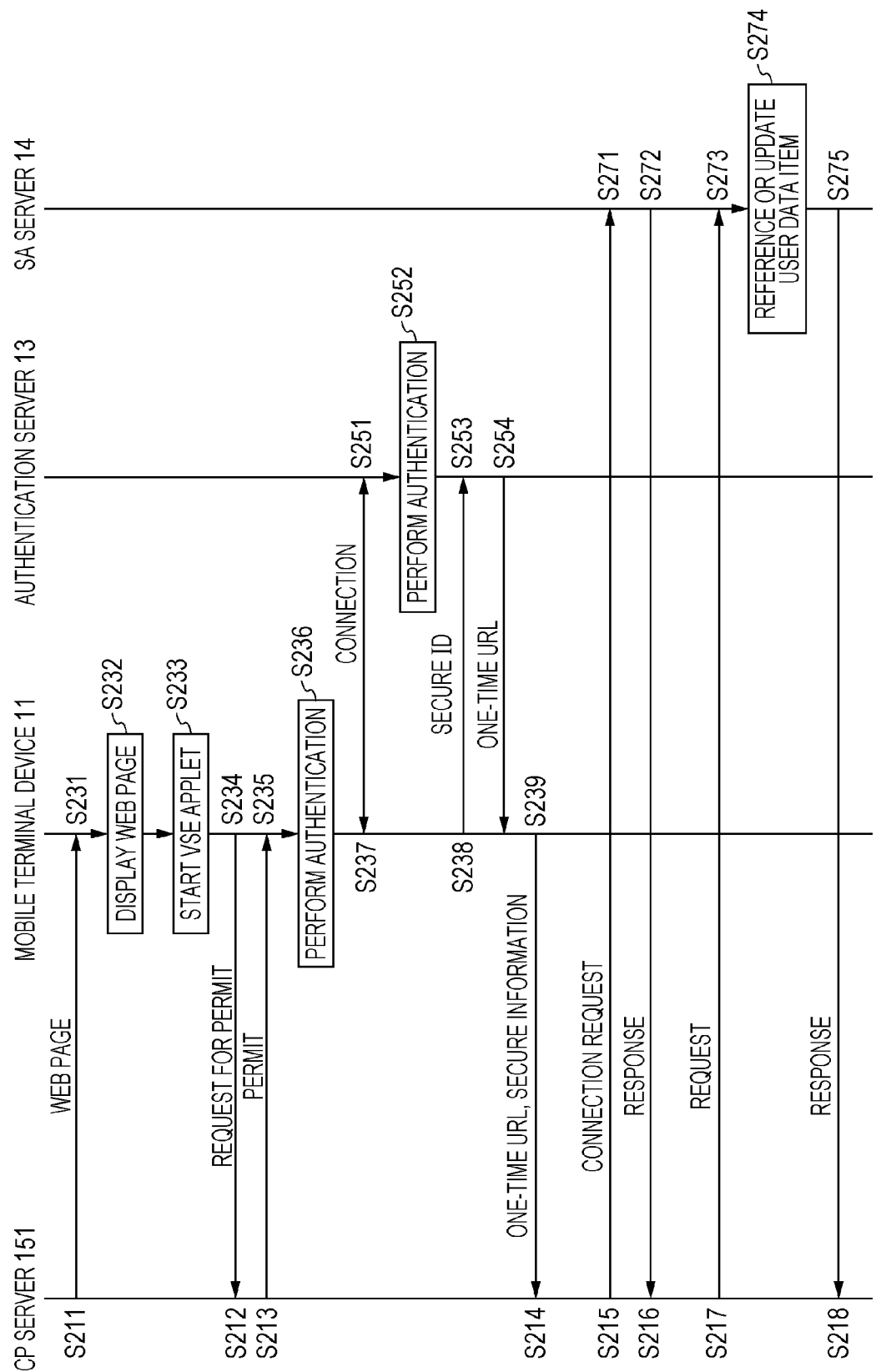
FIG. 11 is a flowchart illustrating another example of the process for referencing or updating user data.

Note that in the flowchart shown in FIG. 11, steps S211 to S213 performed by the CP server 151, steps S231 to S238 performed by the mobile terminal device 11, and steps S251 to S254 performed by the authentication server 13 are similar to steps S111 to S113 performed by the CP server 151, steps S131 to S138 performed by the mobile terminal device 11, and steps S151 to S154 performed by the authentication server in the flowchart shown in FIG. 10, respectively. Accordingly, descriptions thereof are not repeated.

That is, upon receiving the one-time URL from the authentication server 13, the VSE applet 74 of the mobile terminal device 11, in step S239, sends the secure ID acquired from the secure element to the CP server 151 together with the one-time URL.

Upon receiving the one-time URL and the secure ID from the mobile terminal device 11 in step S214, the CP server 151, in step S215, sends a connection request to the SA server 14 on the basis of the one-time URL. Note that the connection request includes the secure ID.

In step S271, the communication unit 111 of the SA server 14 receives the connection request from the CP server 151. The operating system 112 authenticates the CP server 151 on the basis of the secure ID included in the connection request from the CP server 151. In step S272, the communication unit 111 sends a response to the connection request to the CP server 151. In step S216, the CP server 151 receives the response from the VSE applet 74. In this way, connection between the CP server 151 and the SA server 14 is established.

At that time, if the user operates the Web page displayed in the Web browser of the mobile terminal device 11 in order to reference or update the user data item, the CP server 151, in step S217, sends a request command for referencing or updating the user data item to the SA server 14 using the TCAP. The request command includes the secure ID of the mobile terminal device 11 and an AID for identifying an applet used for referencing or updating the user data item.

Upon receiving the request command from the CP server 151 in step S273, the SA server 14, in step S274, references or updates the user data item identified by the secure ID and the AID included in the request command.

In step S275, the SA server 14 sends a response to the request command to the CP server 151 using the TCAP.

Upon receiving a response to the request command from the SA server 14 in step S218, the CP server 151 sends, to the mobile terminal device 11, the information corresponding to the response in the form of a Web page.

Note that the commands communicated between the CP server 151 and the SA server 14 comply with the APDU command format.

As described above, even when the CP server 151 directly sends a request command to the SA server 14, the user of the mobile terminal device 11 can reference or update the user data item in the SA server 14 via the CP server 151.

While the above description has been made with reference to a process in which the user of the mobile terminal device 11 references or updates the user data item in the SA server 14 via the CP server 151, the content provider (CP) that owns the CP server 151 may reference or update the user data item in the SA server 14.

Example 3 of Process for Referencing or Updating User Data

Figure 12:
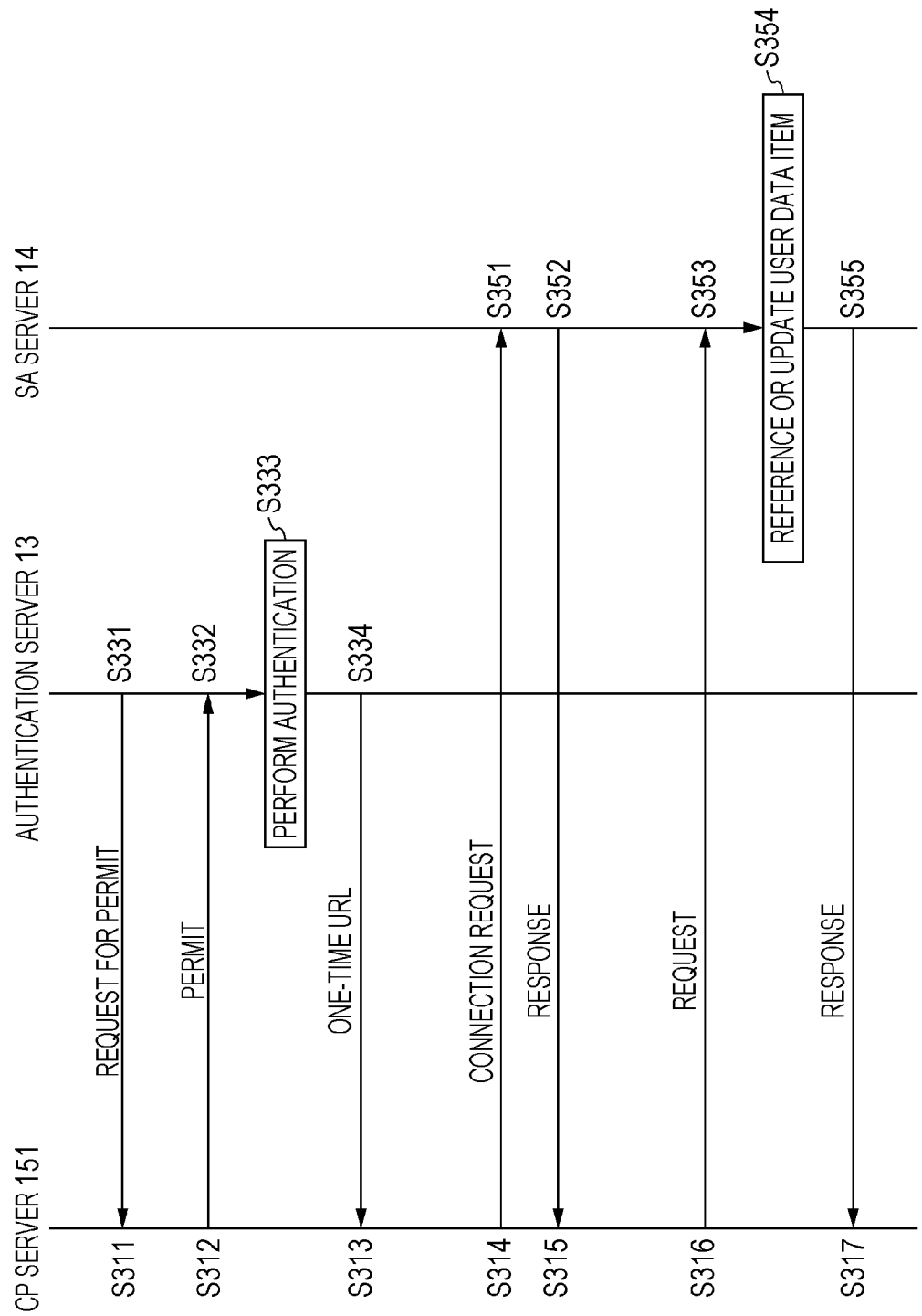
FIG. 12 is a flowchart illustrating yet another example of the process for referencing or updating user data.

A process in which a CP that owns the CP server 151 references or updates the user data item in the SA server 14 is described next with reference to a flowchart shown in FIG. 12.

When the CP server 151 is connected to the authentication server 13, the authentication server 13, in step S331, sends a request for a permit to the CP server 151.

Upon receiving the request for a permit from the authentication server 13 in step S311, the CP server 151 issues a permit for accessing the SA server 14. In step S312, the CP server 151 sends the permit to the authentication server 13.

Upon receiving the permit from the CP server 151 in step S332, the authentication server 13, in step S333, authenticates the received permit. If the permit is successfully authenticated, the authentication processing unit 92 of the authentication server 13 issues a one-time URL.

In step S334, the communication unit 91 of the authentication server 13 sends the one-time URL issued by the authentication processing unit 92 to the CP server 151.

Upon receiving the one-time URL from the authentication server 13 in step S313, the CP server 151, in step S314, sends a connection request to the SA server 14 on the basis of the one-time URL.

Upon receiving the connection request from the CP server 151 in step S351, the communication unit 111 of the SA server 14, in step S352, sends a response to the connection request to the CP server 151. In step S315, the CP server 151 receives the response from the SA server 14. In this way, connection between the CP server 151 and the SA server 14 is established.

At that time, if the CP performs an operation on the CP server 151 in order to reference or update the user data item used for a particular applet, the CP server 151, in step S316, sends a request command for referencing or updating the user data item to the SA server 14 using the TCAP. The request command includes an AID for identifying the particular applet.

Upon receiving the request command from the CP server 151 in step S353, the SA server 14, in step S354, references or updates the user data item identified by the AID included in the request command. At that time, the referenced or updated user data item can be used by the particular applet. User data items corresponding to a plurality of the secure IDs (a plurality of the mobile terminal devices 11, i.e., a plurality of users) can be referenced or updated.

In step S355, the SA server 14 sends a response to the request command to the CP server 151 using the TCAP.

Upon receiving a response to the request command from the mobile terminal device 11 in step S317, the CP server 151 outputs the information corresponding to the response to, for example, a display unit (not shown) of the CP server 151.

In this way, the content provider that owns the CP server 151 can directly reference or update the user data item in the SA server 14. Thus, the content provider can easily recognize the user data items that are stored in the mobile terminal devices 11 of individual users in existing systems. Accordingly, for example, the content provider can provide a new service based on statistical user data. In addition, the content provider can provide a wide variety of services by sharing the user data items with other content providers.

The above description has been made with reference to the information processing system shown in FIG. 1 that can provide services, such as an electronic money service, a ticket gate service, a time card service, or an entrance management service, to users using a mobile terminal device 11.

However, according to the process illustrated in FIG. 7, it takes a certain time from the time a request from the reader/writer 12 is sent to the SA server 14 to the time the request is received by the reader/writer 12. Therefore, it is difficult to apply the process to a high-speed service, such as a ticket gate service.

A configuration and a process that are applicable to a high-speed service are described below.

Another Example of Configuration of Information Processing System

Figure 13:
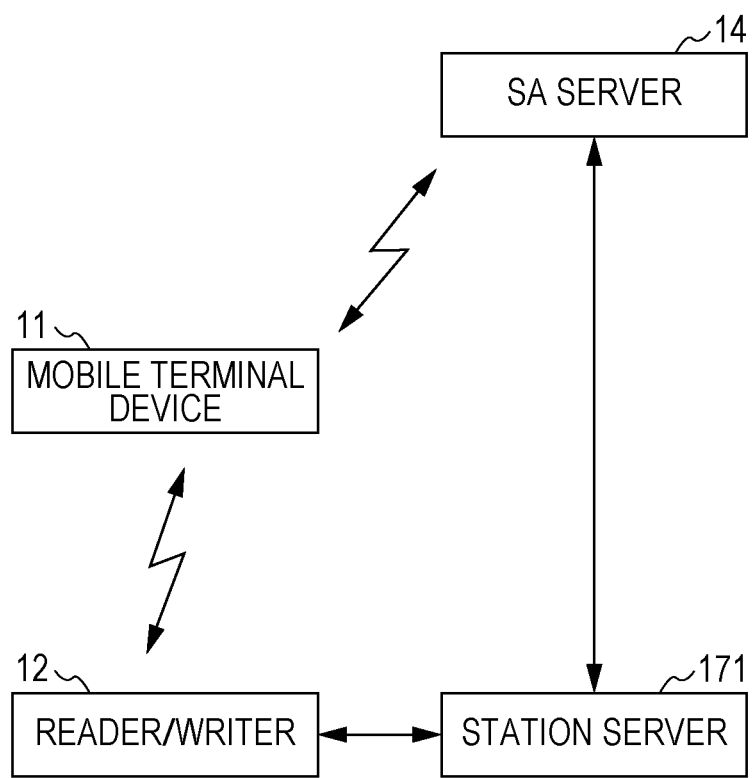
FIG. 13 is a block diagram of an exemplary configuration of an information processing system that provides a high-speed service.

FIG. 13 is a block diagram of an information processing system that provides, in particular, a ticket gate service to users of the mobile terminal devices 11 in railway stations.

Note that the same names and numbering will be used in describing the information processing system in FIG. 13 as was utilized above in describing the information processing system in FIG. 1, and descriptions thereof are not repeated, where appropriate.

That is, as can be seen from the information processing system shown in FIG. 13, the authentication server 13 is removed from the information processing system shown in FIG. 1, and a station server 171 is additionally provided.

Note that the reader/writer 12 is configured as part of a station service apparatus, such as an automatic ticket gate. The reader/writer 12 is connected to the station server 171.

The station server 171 manages information obtained through the processing performed by the station service apparatus including the reader/writer 12. The station server 171 supplies the information to the SA server 14 as necessary. The SA server 14 and the station server 171 are connected to each other via a network, such as the Internet or an intranet.

Note that the SA server 14 is similar to the SA server 14 illustrated in FIG. 8 and including the function of the authentication server 13.

Example of Process for Providing High-Speed Service

An example of a process for providing a service performed by the information processing system shown in FIG. 13 is described next with reference to a flowchart shown in FIG. 14.

For example, if the user taps an icon of the VSE applet 74 displayed on a display screen of the mobile terminal device 11, the mobile terminal device 11, in step S411, starts the VSE applet 74. The VSE applet 74 connects the mobile terminal device 11 to the SA server 14 (step S412 and step S431). In step S432, the authentication processing unit 131 of the SA server 14 authenticates the secure element 76 via the VSE applet 74 and authenticates the mobile terminal device 11. If the mobile terminal device 11 is successfully authenticated, the VSE applet 74 accesses the secure element 76 and acquires the secure ID.

In step S413, the VSE applet 74 sends (supplies) the acquired secure ID to the SA server 14 via the communication unit 75, a base station, and a network, such as the Internet. In addition, the VSE applet 74 sends a request for the user data item corresponding to the secure ID.

In step S433, the communication unit 111 of the SA server 14 receives the secure ID sent from the mobile terminal device 11 via the network, such as the Internet, and supplies the received secure ID to the operating system 112.

In step S434, in response to the request for the user data item corresponding to the secure ID, the data management module 112a of the operating system 112 identifies the user data item corresponding to the secure ID in the personalized DB 113 and supplies a copy of the user data item to the communication unit 111. At that time, the data management module 112a encrypts the copy of the user data item with a signature. In addition, in order to record that time, the data management module 112a may add the time of encryption to the identified user data item in the personalized DB 113 and the copy of the user data item.

In step S434, the communication unit 111 sends the copy of the user data item identified by the data management module 112a to the VSE applet 74.

Upon receiving the copy of the user data item from the SA server 14, the VSE applet 74, in step S414, supplies the copy of the user data item to the middleware 73. In step S451, the middleware 73 acquires the copy of the user data item sent from the VSE applet 74. In step S452, the middleware 73 caches the copy of the user data item in a storage area (not shown).

At that time, in the mobile terminal device 11, the copy of the user data item may be temporarily stored in a storage area (not shown). Alternatively, the copy of the user data item may be stored in the form of persisted data. Thereafter, every time a new user data item is sent from the SA server 14, the persisted data may be updated.

In addition, in step S415, the VSE applet 74 activates the mobile terminal device 11. More specifically, the VSE applet 74 changes the display color of the display screen of the mobile terminal device 11 and causes the CLF 77 to enter a standby mode for near field communication.

At that time, since the display color of the display screen of the mobile terminal device 11 is changed, the user recognizes that the mobile terminal device 11 can perform near field communication and passes the mobile terminal device 11 over the reader/writer 12 integrated into the automatic ticket gate (moves the mobile terminal device 11 closer to the reader/writer 12).

Although not shown, if the mobile terminal device is in close proximity to the reader/writer 12, the reader/writer 12 sends polling to the CLF 77 and the CLF 77 returns a response to the polling to the reader/writer 12. That is, the reader/writer 12 recognizes the mobile terminal device 11 serving as a communication partner.

In step S471, the reader/writer 12 sends a system code used for identifying a system to the CLF 77. In this case, the sent system code indicates that the system in which the mobile terminal device 11 is used is a ticket gate system.

Upon receiving the system code from the reader/writer 12, the CLF 77, in step S491, supplies the system code to the middleware 73.

Upon receiving the system code from the CLF 77 in step S453, the middleware 73, in step S454, enters an emulation mode. Thus, the middleware 73 can perform processing related to a ticket gate process. Note that instead of sending the system code, the reader/writer 12 can send information used for the middleware 73 to emulate an applet that executes processing related to a ticket gate process. For example, the above-described select(AID), which is one of APDU commands, may be sent from the reader/writer 12.

While the above description has been made with reference to the middleware 73 that emulates an applet for performing a process related to a ticket gate process, the VSE applet 74 may emulate an applet for performing a process related to a ticket gate process.

Subsequently, in step S455, the middleware 73 supplies a response to the system code to the CLF 77. Upon receiving the response from the middleware 73, the CLF 77, in step S492, sends the response to the reader/writer 12.

Upon receiving the response from the CLF 77 in step S472, the reader/writer 12, in step S473, sends a read request (a READ command) for a user data item. Upon receiving the read request from the reader/writer 12, the CLF 77, in step S493, sends the read request to the middleware 73.

Upon receiving the read request from the CLF 77 in step S456, the middleware 73, in step S457, supplies the copy of the user data item with a signature cached in the storage area (not shown) to the CLF 77 as a response to the read request.

Upon receiving the response (the copy of the user data item) from the middleware 73 in step S494, the CLF 77 sends the response to the reader/writer 12.

Upon receiving the response from the CLF 77 in step S474, the reader/writer 12, in step S475, performs a process for opening/closing the automatic ticket gate. In addition, if the copy of the user data item includes a signature and a time stamp, the reader/writer 12 may verify the signature and the time stamp and performs a process for opening/closing the automatic ticket gate in accordance with the result of the verification.

In this way, the user of the mobile terminal device can go through the automatic ticket gate by passing the mobile terminal device 11 over the reader/writer 12 integrated into the automatic ticket gate.

In step S476, the reader/writer 12 supplies a write request for a user data item stored in the SA server 14 to the station server 171 on the basis of the response (the copy of the user data item) from the CLF 77. In this case, the write request includes the above-described signature.

Upon acquiring the write request from the reader/writer 12 in step S511, the station server 171, in step S512, sends the write request to the SA server 14. Note that before sending the write request to the SA server 14, the station server 171 may send an authentication request to the SA server 14 and receive the response to the authentication request. Thereafter, the station server 171 may send a write request to the SA server 14.

Upon receiving the write request from the station server 171 in step S435, the SA server 14, in step S436, updates, using the signature attached to the write request, the user data item with the signature. More specifically, balance information of electronic money stored in the personalized DB 113 as the user data item is updated into balance information reduced by the freight that the user of the mobile terminal device 11 paid. Note that if the user data item includes time information, the SA server 14 may verify the integrity of the user data item on the basis of the time information and the time at which the SA server 14 received the write request from the station server 171.

According to the above-described processing, the copy of the user data item stored in the SA server 14 is cached in the mobile terminal device 11, and a process related to near field communication is performed on the basis of the copy of the user data item by the mobile terminal device 11 instead of the SA server 14. Accordingly, a high-speed service, such as a ticket gate service, can be provided.

Note that it is not necessary that a process from sending of a write request by the station server 171 and updating of the user data item by the SA server 14 be performed in real time. The process may be performed in a batch mode.

While the embodiment has been described with reference to the secure ID of the secure element 76 as the authentication information of the mobile terminal device 11, any information that securely authenticates the mobile terminal device 11 can be employed. For example, if the mobile terminal device 11 is a cell phone, the telephone number may be employed as the authentication information. If the mobile terminal device 11 includes a biometric authentication function, such as a fingerprint authentication function, the biometric information may be employed as the authentication information. Alternatively, information that is unique to a universal integrated circuit card (UICC) that is used to store an applet executed in an existing mobile terminal device 11 may be employed as the authentication information.

In addition, while the embodiment has been described with reference to near field communication performed between the mobile terminal device 11 and the reader/writer 12 using the Type A or Type B method defined by ISO 18092, a method other than the Type A and Type B method may be employed. Furthermore, near field communication performed between the mobile terminal device 11 and the reader/writer 12 may be contact communication using a terminal instead of noncontact communication.

Still furthermore, while the above embodiment has been described with reference to the information processing system including a single SA server 14, an SA server may be provided for each of the applets (i.e., each of the content providers that provide the applets).

Yet still furthermore, while the above embodiment has been described with reference to the VSE applet 74 having a plurality of functions, each of a plurality of the VSE applets 74 may have its own function.

The above-described series of processes can be executed not only by hardware but also by software. When the above-described series of processes are executed by software, the programs of the software are installed from a program recording medium into a computer incorporated in dedicated hardware or a computer that can execute a variety of functions by installing a variety of programs therein (e.g., a general-purpose personal computer).

As shown in FIG. 3, the program recording medium storing the programs to be installed in the computer and to be executed by the computer is formed from the removable medium 61 which is a packaged medium, the ROM 52 that temporarily or permanently stores the programs, or the RAM 53 or a hard disk that permanently stores the programs. Examples of the removable medium 61 include a magnetic disk (including a flexible disk), an optical disk (including a CD-ROM (Compact Disc-Read Only Memory), a DVD (Digital Versatile Disc), and a magnetooptical disk), or a semiconductor disk. The programs are stored in the program recording medium via a communication unit (not shown) serving as an interface, such as a router or a modem, using a wired or wireless communication medium, such as a network, a local area network, the Internet, or digital broadcasting as necessary.

In addition, the program executed by the computer may be a program that executes the processes in the above-described sequence or a program that executes the processes in parallel or on demand.

It should be understood by those skilled in the art that embodiments of the present disclosure are not limited to the above-described embodiments and various modifications can be made within the scope of the appended claims or the equivalents thereof.

What is claimed is:

1. An information processing apparatus for communicating with a mobile electronic device that performs first communication which is non-contact near field communication, the information processing apparatus performing second communication different from the first communication with the mobile electronic device, said information processing apparatus comprising:

a data storage unit configured to store a number of data items, in which a data item is stored in a storage area for each user who uses the mobile electronic device;

a program storage unit configured to store an application program that executes a service related to the first communication using the data item;

a communication unit configured to perform the second communication with the mobile electronic device;

an authentication unit configured to authenticate the mobile electronic device;

a data identifying unit configured to identify from among the number of stored data items of the data storage unit a respective data item for the user of the mobile electronic device authenticated by the authentication unit on the basis of authentication information sent from the mobile electronic device authenticated by the authentication unit, in which the respective identified data item is used by the application program; and an execution unit configured to execute, on the basis of (i) application program identification information that is used with the respective identified data item for identifying the application program that executes the service related to the first communication and that is sent by way of the mobile electronic device and (ii) the respective identified data item, the application program corresponding to the application program identification information, in which the mobile electronic device is configured to perform the non-contact near field communication with an external device which is not in direct communication contact with the information processing apparatus, in which the application program identification information is sent from the external device by way of the mobile electronic device to the execution unit, and in which said information processing apparatus enables (i) execution of the application program based on the application program identification information and the respective identified data item to be performed thereat so as to provide a corresponding service related to the non-contact near field communication with the external device for use by the user of the mobile electronic device and (ii) a communication log of communication between said information processing apparatus and the external device to be provided which is indicative of a transaction log representative of non-contact near field communication performed by the mobile electronic device.

2. The information processing apparatus according to claim 1, wherein the data identifying unit identifies the respective identified data item stored in the storage area for the user of the mobile electronic device in response to a request sent from a providing apparatus that provides content to the mobile electronic device and that is authenticated by the mobile electronic device via the mobile electronic device.

3. The information processing apparatus according to claim 1, wherein the data identifying unit identifies the respective identified data item stored in the storage area for the user of the mobile electronic device in response to a request sent directly from a providing apparatus that provides content to the mobile electronic device and that is authenticated by the mobile electronic device.

4. The information processing apparatus according to claim 1, wherein the authentication unit authenticates a providing apparatus that provides content to the mobile electronic device, and wherein the data identifying unit identifies the respective identified data item stored in the storage area for the user of the mobile electronic device in response to a request sent from the providing apparatus authenticated by the authentication unit.

5. The information processing apparatus according to claim 1, wherein the communication unit sends, to the mobile electronic device, a copy of the data item stored in the storage area of the data storage unit for the user of the mobile electronic device authenticated by the authentication unit, and wherein the identifying unit identifies the respective identified data item in response to a request sent from a communication partner of the first communication performed by the mobile electronic device as a result of emulation of the application program for executing the service related to the first communication in the mobile electronic device.

6. The information processing apparatus according to claim 1, wherein the respective identified data item includes time information.

7. An information processing method for use in an information processing apparatus for communicating with a mobile electronic device that performs first communication which is non-contact near field communication, the information processing apparatus performing second communication different from the first communication with the electronic device, the information processing apparatus including a data storage unit configured to store a number of data items, in which a data item is stored in a storage area for each user who uses the mobile electronic device, a program storage unit configured to store an application program that executes a service related to the first communication using the data item, and a communication unit configured to perform the second communication with the mobile electronic device, the method comprising:

authenticating the mobile electronic device;

identifying from among the number of stored data items of the data storage unit a respective data item for the user of the authenticated mobile electronic device on the basis of authentication information sent from the authenticated electronic device, in which the respective identified data item is used by the application program; and executing, on the basis of (i) identification information that is used with the respective identified data item for identifying the application program that executes the service related to the first communication and that is sent by way of the mobile electronic device and (ii) the respective identified data item, the application program corresponding to the identification information, in which the mobile electronic device is configured to perform the non-contact near field communication with an external device which is not in direct communication contact with the information processing apparatus, in which the identification information is sent from the external device by way of the mobile electronic device to the execution unit, and in which said information processing apparatus enables (i) execution of the application program based on the identification information and the respective identified data item to be performed thereat so as to provide a corresponding service related to the non-contact near field communication with the external device for use by the user of the mobile electronic device and (ii) a communication log of communication between said information processing apparatus and the external device to be provided which is indicative of a transaction log representative of non-contact near field communication performed by the mobile electronic device.

8. A non-transitory computer readable recording medium having stored thereon a program comprising:

program code for causing a computer to execute a process performed in an information processing apparatus for communicating with a mobile electronic device that performs first communication which is non-contact near field communication, the information processing apparatus performing second communication different from the first communication with the mobile electronic device, the information processing apparatus including a data storage unit configured to store a number of data items, in which a data item is stored in a storage area for each user who uses the mobile electronic device, a program storage unit configured to store an application program that executes a service related to the first communication using the data item, and a communication unit configured to perform the second communication with the mobile electronic device, the process including authenticating the mobile electronic device, identifying from among the number of stored data items of the data storage unit a respective data item for the user of the authenticated mobile electronic device on the basis of authentication information sent from the authenticated electronic device in which the respective identified data item is used by the application program, and executing, on the basis of (i) identification information that is used with the respective identified data item for identifying the application program that executes the service related to the first communication and that is sent by way of the mobile electronic device and (ii) the respective identified data item, the application program corresponding to the identification information, in which the mobile electronic device is configured to perform the non-contact near field communication with an external device which is not in direct communication contact with the information processing apparatus, in which the identification information is sent from the external device by way of the mobile electronic device to the execution unit, and in which said information processing apparatus enables (i) execution of the application program based on the identification information and the respective identified data item to be performed thereat so as to provide a corresponding service related to the non-contact near field communication with the external device for use by the user of the mobile electronic device and (ii) a communication log of communication between said information processing apparatus and the external device to be provided which is indicative of a transaction log representative of non-contact near field communication performed by the mobile electronic device.

9. An information processing system comprising:

a mobile electronic device that performs first communication which is non-contact near field communication; and first and second information processing apparatuses for communicating with the mobile electronic device, the first and second information processing apparatuses performing second communication different from the first communication with the electronic device;

wherein the first information processing apparatus includes an authentication unit configured to authenticate the mobile electronic device, and wherein the second information processing apparatus includes a data storage unit configured to store a number of data items, in which a data item is stored in a storage area for each user who uses the mobile electronic device, a program storage unit configured to store an application program that executes a service related to the first communication using the data item, a communication unit configured to perform the second communication with the mobile electronic device, an authentication unit configured to authenticate the mobile electronic device, an identifying unit configured to identify from among the number of stored data items of the data storage unit a respective data item for the user of the mobile electronic device authenticated by the first information processing apparatus on the basis of authentication information sent by way of the mobile electronic device authenticated by the first information processing apparatus in which the respective identified data item is used by the application program, and an execution unit configured to execute, on the basis of (i) identification information that is used with the respective identified data item for identifying the application program that executes the service related to the first communication and that is sent from the mobile electronic device and (ii) the respective identified data item, the application program corresponding to the identification information, in which the mobile electronic device is configured to perform the non-contact near field communication with an external device which is not in direct communication contact with the first and second information processing apparatuses, in which the identification information is sent from the external device by way of the mobile electronic device to the execution unit, and in which said second information processing apparatus enables (i) execution of the application program based on the identification information and the respective identified data item to be performed thereat so as to provide a corresponding service related to the non-contact near field communication with the external device for use by the user of the mobile electronic device and (ii) a communication log of communication between said information processing apparatus and the external device to be provided which is indicative of a transaction log representative of non-contact near field communication performed by the mobile electronic device.

* * * * *